United States Patent
Epstein

(10) Patent No.: US 12,210,894 B2
(45) Date of Patent: Jan. 28, 2025

(54) WI-FI VIRTUALIZATION

(71) Applicant: Omnifi Inc., Pleasanton, CA (US)

(72) Inventor: Joseph Alan Epstein, Pleasanton, CA (US)

(73) Assignee: Omnifi Inc., Pleasanton, CA (US)

( * ) Notice: Subject to any disclaimer, the term of this patent is extended or adjusted under 35 U.S.C. 154(b) by 387 days.

(21) Appl. No.: 17/404,408

(22) Filed: Aug. 17, 2021

(65) Prior Publication Data
US 2022/0058047 A1    Feb. 24, 2022

Related U.S. Application Data

(60) Provisional application No. 63/067,189, filed on Aug. 18, 2020.

(51) Int. Cl.
G06F 9/455    (2018.01)
G06F 9/50    (2006.01)
H04W 84/12    (2009.01)

(52) U.S. Cl.
CPC ........ G06F 9/45558 (2013.01); G06F 9/5055 (2013.01); H04W 84/12 (2013.01); G06F 2009/45562 (2013.01); G06F 2009/45579 (2013.01); G06F 2009/45595 (2013.01); G06F 2209/5021 (2013.01); G06F 2209/506 (2013.01)

(58) Field of Classification Search
None
See application file for complete search history.

(56) References Cited

U.S. PATENT DOCUMENTS

| | | | | |
|---|---|---|---|---|
| 2006/0104292 A1* | 5/2006 | Gupta | ................. | H04L 12/5692 370/401 |
| 2008/0168030 A1* | 7/2008 | Songer | ................... | H04W 48/18 |
| 2008/0222375 A1* | 9/2008 | Kotsovinos | ........... | G06F 3/0617 709/230 |
| 2009/0199281 A1* | 8/2009 | Cai | ........................ | H04M 15/93 726/7 |
| 2009/0254924 A1* | 10/2009 | Anirudh | .............. | G06F 9/45558 719/321 |
| 2011/0286380 A1* | 11/2011 | Zhu | ........................ | H04W 88/02 370/315 |
| 2011/0321065 A1* | 12/2011 | Gopalakrishnan | .... | G06F 9/4411 718/1 |
| 2012/0005691 A1* | 1/2012 | Wong | .................. | G06F 9/45558 719/321 |
| 2012/0240235 A1* | 9/2012 | Moore | ................ | H04L 63/1433 726/25 |
| 2012/0250539 A1* | 10/2012 | Lin | ........................ | H04W 4/21 455/67.11 |

(Continued)

OTHER PUBLICATIONS

International Search Report and Written Opinion for Application No. PCT/US21/46283, mailed on Nov. 22, 2021, 12 pages.

(Continued)

*Primary Examiner* — Adam Lee
(74) *Attorney, Agent, or Firm* — Baker Botts L.L.P.

(57) ABSTRACT

In one embodiment, a wireless network system includes a set of one or more wireless radios, and a set of software for the wireless network system that comprises a data structure representing the set of one or more wireless radios and a virtualization module that registers one or more virtualized data structures representing a virtual proxy of the set of one or more wireless radios.

30 Claims, 22 Drawing Sheets

(56) References Cited

U.S. PATENT DOCUMENTS

| | | | | |
|---|---|---|---|---|
| 2012/0278397 | A1* | 11/2012 | Lindsay | H04L 51/18 709/206 |
| 2012/0307792 | A1* | 12/2012 | Ram | H04W 48/02 370/329 |
| 2013/0208589 | A1* | 8/2013 | Lopez Toledo | H04W 72/543 370/336 |
| 2013/0317892 | A1* | 11/2013 | Heerboth | H04W 8/005 705/14.4 |
| 2014/0233568 | A1* | 8/2014 | Dong | H04L 45/741 370/392 |
| 2014/0341129 | A1* | 11/2014 | Zhu | H04L 5/00 370/329 |
| 2014/0365557 | A1* | 12/2014 | Maehara | H04L 67/52 709/203 |
| 2015/0237667 | A1* | 8/2015 | Ghai | H04L 61/5007 370/338 |
| 2016/0014613 | A1* | 1/2016 | Ponnampalam | H04L 41/0823 370/254 |
| 2016/0021684 | A1* | 1/2016 | Lewis | H04W 4/80 370/329 |
| 2016/0294706 | A1* | 10/2016 | Lang | H04L 63/0853 |
| 2017/0208039 | A1* | 7/2017 | Godfrey | G06F 9/00 |
| 2017/0230287 | A1* | 8/2017 | Hall | H04L 69/22 |
| 2019/0068689 | A1* | 2/2019 | Ram | H04L 41/08 |
| 2019/0320337 | A1* | 10/2019 | Siomina | H04W 24/10 |
| 2019/0347127 | A1* | 11/2019 | Coady | G06F 8/63 |
| 2020/0229206 | A1 | 7/2020 | Badic | |
| 2021/0240359 | A1* | 8/2021 | Danilov | G06F 11/2094 |
| 2021/0243639 | A1* | 8/2021 | Sanaullah | H04W 28/0257 |
| 2021/0352508 | A1* | 11/2021 | Azarfar | H04W 76/19 |

OTHER PUBLICATIONS

Lei Xia et al., "Virtual WiFi", Virtual Execution Environments, pp. 181-192, XP058002181, Mar. 9, 2011, 13 pages, VEE'11, Researchgate; web retrieval: https://www.researchgate.net/publication/221137794, DOI: 10.1145/1952682.1952706, New York, NY.

Berg Johannes, "The 802.11 subsystems for kernel developers", pp. 1-58, XP093183565, Feb. 17, 2020, 137 pages, web retrieval: https://web.archive.org/web/20200217013551/https://landley.net/kdocs/Documentati on/DocBook/xhtml-nochunks/80211.html.

Milasinovic, Goran, "Extended Supplemental European Search Report" for European patent application No. EP21858959, dated Jul. 25, 2024, 9 pages, published by the European Patent Office, Munich, Germany.

* cited by examiner

FIG. 8

| Command | Allowance | Resource Constraint | Error code |
|---|---|---|---|
| suspend | Yes | | |
| resume | Yes | | |
| set_wakeup | Yes | | |
| add_virtual_intf | Yes | 4 limit | -ENOMEM |
| del_virtual_intf | Yes | | |
| change_virtual_intf | Yes | | |
| add_key | Yes | | |
| get_key | Yes | | |
| del_key | Yes | | |
| set_default_key | Yes | | |
| set_default_mgmt_key | Yes | | |
| start_ap | Yes | | |
| change_beacon | Yes | | |
| stop_ap | Yes | | |
| add_station | Yes | 1/3rd of max stations | -ENOMEM |
| del_station | Yes | | |
| change_station | Yes | | |
| get_station | Yes | | |
| dump_station | Yes | | |
| add_mpath | Yes | | |
| del_mpath | Yes | | |
| change_mpath | Yes | | |
| get_mpath | Yes | | |
| dump_mpath | Yes | | |
| get_mpp | Yes | | |
| dump_mpp | Yes | | |
| get_mesh_config | No | | -EOPNOTSUPP |
| update_mesh_config | No | | -EOPNOTSUPP |
| join_mesh | No | | -EOPNOTSUPP |
| leave_mesh | No | | -EOPNOTSUPP |
| join_ocb | No | | -EOPNOTSUPP |
| leave_ocb | No | | -EOPNOTSUPP |
| change_bss | Yes | | |
| set_txq_params | Yes | Highest prio vphy wins | |
| libertas_set_mesh_channel | No | | -EOPNOTSUPP |
| set_monitor_channel | Yes | | |
| scan | Yes | Once per minute | -EAGAIN |
| abort_scan | Yes | | |
| auth | Yes | | |
| assoc | Yes | | |
| deauth | Yes | | |
| disassoc | Yes | | |
| connect | Yes | | |
| update_connect_params | Yes | | |
| disconnect | Yes | | |
| join_ibss | No | | -EOPNOTSUPP |
| leave_ibss | No | | -EOPNOTSUPP |
| set_mcast_rate | Yes | | |
| set_wiphy_params | No | | -EOPNOTSUPP |
| set_tx_power | No | | -EOPNOTSUPP |

FIG. 8 (CONTINUED)

| | | | |
|---|---|---|---|
| get_tx_power | Yes | | |
| set_wds_peer | No | | -EOPNOTSUPP |
| rfkill_poll | Yes | | |
| testmode_cmd | No | | -EOPNOTSUPP |
| testmode_dump | No | | -EOPNOTSUPP |
| set_bitrate_mask | Yes | | |
| dump_survey | Yes | | |
| set_pmksa | Yes | | |
| del_pmksa | Yes | | |
| flush_pmksa | Yes | | |
| remain_on_channel | Yes | Once per minute | -EAGAIN |
| cancel_remain_on_channel | Yes | | |
| mgmt_tx | Yes | | |
| mgmt_tx_cancel_wait | Yes | | |
| set_power_mgmt | No | | -EOPNOTSUPP |
| set_cqm_rssi_config | No | | -EOPNOTSUPP |
| set_cqm_rssi_range_config | No | | -EOPNOTSUPP |
| set_cqm_txe_config | No | | -EOPNOTSUPP |
| mgmt_frame_register | Yes | | |
| set_antenna | No | | -EOPNOTSUPP |
| get_antenna | No | | -EOPNOTSUPP |
| sched_scan_start | Yes | Scans once a minute | -ENOMEM |
| sched_scan_stop | Yes | | |
| set_rekey_data | Yes | | |
| tdls_mgmt | Yes | | |
| tdls_oper | Yes | | |
| probe_client | Yes | | |
| set_noack_map | No | | -EOPNOTSUPP |
| get_channel | Yes | | |
| start_p2pdevice | No | | -EOPNOTSUPP |
| stop_p2pdevice | No | | -EOPNOTSUPP |
| set_mac_acl | Yes | | |
| start_radar_detection | Yes | | |
| update_ft_ies | Yes | | |
| crit_proto_start | No | | -EOPNOTSUPP |
| crit_proto_stop | No | | -EOPNOTSUPP |
| set_coalesce | No | | -EOPNOTSUPP |
| channel_switch | Yes | | |
| set_qos_map | Yes | virtualized | |
| set_ap_chanwidth | Yes | | |
| add_tx_ts | Yes | | |
| del_tx_ts | Yes | | |
| tdls_channel_switch | Yes | | |
| tdls_cancel_channel_switch | Yes | | |
| start_nan | No | | -EOPNOTSUPP |
| stop_nan | No | | -EOPNOTSUPP |
| add_nan_func | No | | -EOPNOTSUPP |
| del_nan_func | No | | -EOPNOTSUPP |
| nan_change_conf | No | | -EOPNOTSUPP |
| set_multicast_to_unicast | Yes | | |

WI-FI VIRTUALIZATION

BENEFIT CLAIM

This application claims the benefit under 35 U.S.C. § 119(e) of provisional application No. 63/067,189, filed 18 Aug. 2020, the entire contents of which is hereby incorporated by reference for all purposes as if fully set forth herein.

TECHNICAL FIELD

One technical field of this disclosure is wireless networking. Another technical field is the software architecture and functions of Wi-Fi access points. Another technical field is virtual machine architectures and functions.

BACKGROUND

In the IEEE 802.11 wireless local area networking standards (including Wi-Fi), a service set is a group of wireless network devices which share a service set identifier (SSID). A service set forms a logical network of nodes operating with shared link-layer networking parameters. A service set is either a basic service set (BSS) or an extended service set (ESS). A basic service set is a subgroup, within a service set, of devices that share physical-layer medium access characteristics (e.g. radio frequency, modulation scheme, security settings) such that they are wirelessly networked. The basic service set is defined by a basic service set identifier (BSSID) shared by all devices within it.

While a device may have multiple BSSIDs, usually each BSSID is associated with at most one basic service set at a time. An infrastructure BSS is created by an infrastructure device called an access point (AP) for other devices to join. The operating parameters of the infrastructure BSS are defined by the AP.

SUMMARY OF PARTICULAR EMBODIMENTS

The appended drawings may serve as a summary of the invention.

BRIEF DESCRIPTION OF THE DRAWINGS

FIG. 8 illustrates an example table mapping operations to allowance, resource constraints, and error codes.

DESCRIPTION OF EXAMPLE EMBODIMENTS

Structural and Functional Overview

Figure 1:
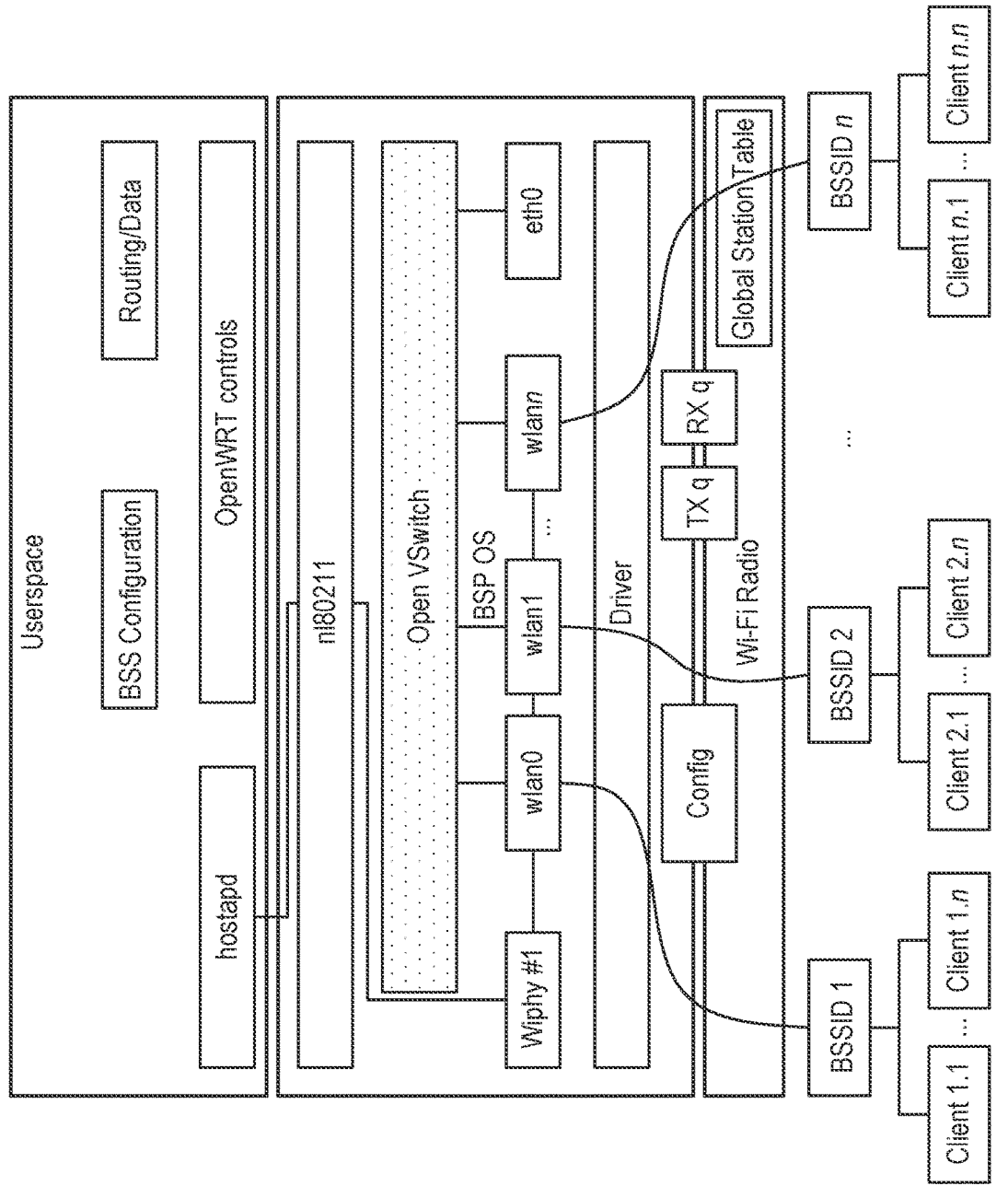
FIG. 1 illustrates the state of prior art in a multiple virtual access point Linux-based AP platform, showing the deep commingling of the software infrastructure between "virtual" APs.

In particular embodiments, a wireless network system may comprise a set of one or more wireless radios and a set of software for the wireless network system that may comprise a data structure representing the set of one or more wireless radios and a virtualization module that may register one or more virtualized data structures representing a virtual proxy of the set of one or more wireless radios. The virtualization module may create one or more network endpoints representing an underlying virtualization granularity. Each of the one or more endpoints may be associated with a corresponding virtual data structure.

In particular embodiments, the one or more virtualized data structures may be accessed through a user space interface. In particular embodiments, the virtualization module may reside in user space. The virtualization module may register the one or more virtualized data structures through a tap driver. In particular embodiments, the virtualization module in the user space may exercise one or more commands for changing state of the one or more virtualized data structures through a user space interface. The one or more commands may comprise adding or removing interfaces, starting new BSSs, changing the keys for stations, adjusting power and antennas, changing channels, starting scans, requesting radar detection, adjusting the association handshake, or any suitable command.

In particular embodiments, the set of software for the wireless network system may further comprise a permission module associated with the virtualization module that may maintain allocated resources to one of the one or more virtualized data structure and allow changes to the one of the one or more virtualized data structures within limits of the allocated resources. The permission module may map each possible operation to allowed behaviors, resource constraints, and responses for failure. Each of the one or more virtualized data structures may be associated with a priority for a command for controlling the set of one or more wireless radios such that a command associated with a virtualized data structure of a higher priority may take precedence over a command associated with a virtualized data structure of a lower priority.

In particular embodiments, the set of software for the wireless network system may further comprise a data plane ferry that relays traffic between a driver's interface and a virtual interface associated with one of the one or more virtualized data structures. In particular embodiments, the set of software for the wireless network system may further comprise a pair of virtual interfaces associated with one of the one or more virtualized data structures.

In particular embodiments, the virtualization module may register a virtualized data structure isolated in a virtualization container. In particular embodiments, the virtualization module may be placed on a host hardware model process while the one or more virtual data structures may be placed within a virtual machine (VM). the virtualization module may bridge connections between the one or more virtual data structures and a real data structure representing the set of one or more wireless radios. In particular embodiments, one of the one or more virtual data structures may be on a host machine while the data structure is on a virtual machine.

In particular embodiments, the virtualization module may be on a host hardware model process while the set of one or more wireless radios and the data structure representing the set of one or more wireless radios may be on a remote machine. A virtualization agent on the remote machine may configure and discover a state of the set of one or more wireless radios. The virtualization agent on the remote machine and the virtualization module on the host hardware model process communicate over a network. In particular embodiments, the virtualization module may be on a compute cloud while the virtualization agent and the set of one or more wireless radios may be on a radio cloud.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

Context of Disclosure—False Virtualization in Prior Approaches

The software architecture for Wi-Fi is currently locked to the notion of the hardware on which it runs. At the driver level, this is partially solved on Linux—the operating system of choice for access points—through the standardization of wireless control interfaces such as the cfg80211 interface. However, the model for these interfaces is dependent directly on the attachment and control of underlying hardware. Specifically, throughout the stack, the designs of present systems assume that one CPU is directly attached to one or more hardware radios, controlled by one or more local drivers, and the software has direct control over the Wi-Fi environment. This assumption has many consequences. Many Wi-Fi radio silicon vendors for access points sell all-in-one CPU and radio solutions, which means that the entire board support package is provided by the silicon manufacturer. The silicon manufacturers choose the kernel version, the module configurations, the version of the "standard" APIs used to communicate, the version and capabilities of the software layer provided above, and whatever proprietary patches and interfaces are needed to operate the system. Often, this comes in an OpenWRT firmware build—and an implementation in firmware is the essence of being tied to the hardware.

For a producer of Wi-Fi solutions, the aforesaid approach leads to great difficulty in being independent of the hardware. The board support package requires the producer of Wi-Fi solutions to customize and adapt their software solutions to that customized hardware-based package, causing significant expense whenever the board support package changes. Changing the Wi-Fi radio silicon vendor is significantly difficult and expensive, as the producer's infrastructure needs to be completely ported into the new vendor's environment, causing often one to two year delays in new product introduction.

For a consumer of Wi-Fi, this means that the hardware that the Wi-Fi solution producer provides must be deeply tied into the software that the Wi-Fi solution producer provides. Enterprise Wi-Fi purchasers are forced to use only the producer's software on the hardware radios that the enterprise paid to install. Therefore, changing vendors requires not only paying a new Wi-Fi producer for their software licenses, but replacing all of the hardware with new hardware.

In the data center, a direct tie between software and hardware has been solved by the use of compute workload virtualization, such as provided in open source Xen, Kernel-based Virtual Machine (KVM), and proprietary solutions from virtualization vendors. However, no such technology for Wi-Fi exists yet.

The term "virtual access point" currently means an ability to run multiple BSSIDs off of the same radio. However, a virtual access point is virtual only in the sense that multiple networks can share the same radio, not that multiple software platforms can share the same radio. In fact, in the prior art, the software must be tightly integrated, so that the details can be coordinated to allow for the shared queue and channel management in the driver—since, necessarily, one radio can only have one channel setting at a time. And because that is true, the APIs northbound from the driver maintain that combination to the top of the software stack.

FIG. 1 illustrates the state of prior art in a multiple virtual access point Linux-based AP platform, showing the deep commingling of the software infrastructure between "virtual" APs. Each BSSID corresponds to a "virtual AP," each of which is associated with its own clients. The Wi-Fi radio implements the virtual APs by maintaining one global station table shared across all BSSIDs but keeping track of which BSSID a client is assigned to, so that responses can be generated on the right BSSID. The architecture presents a shared queue and configuration infrastructure (such as PCI configuration) to the host. After all, only one hardware radio exists on the host. The driver communicates with the one radio, and presents one "wiphy"—the cfg80211 representation of a radio in software—to the host, but creates separate network device interfaces (wlan0 . . . ), one for each BSSID, so that the driver can be able to map traffic sent on a wlan interface to the appropriate BSSID. Though this is not necessary for unicast traffic, as a client can be on only one BSSID at a time in most cases, broadcast traffic needs to be marked for which BSSID the traffic is intended so that different BSSIDs can belong to different broadcast domains. Above each interface is a shared OpenVSwitch implementation (or traditional bridging), with the usual goal of configuring separate broadcast domains within the one OpenVSwitch as needed. One nl80211 kernel netlink service connects to usually one hostapd process in user space, which configures all of the BSSIDs at once from a shared configuration, which may be OpenWRT driven. Thus, an administrator logged into OpenWRT may view the entire setup as within her domain, merely as separate VLANs within one configuration.

The separate wlan interfaces may be considered to provide an opportunity to use traditional data center virtualization techniques. However, using traditional data center virtualization techniques is impossible using the prior art techniques. Each wlan interface shares the wiphy. Thus, the kernel will not even allow the wlan interfaces to be placed into separate container network namespaces. A containerization system such as Docker must take all of the wlan interfaces associated with a hardware radio into a container or none at all. And none of the virtualization platforms are able to move just one interface inside the VM, because only standard Ethernet networks are supported for virtualization. None of the cfg80211 APIs cross the boundary. Furthermore, the virtualization platforms do not allow the intake of any interface (except those that support 10 virtualization by hosting multiple PCI interfaces for the same device, in which case the PCI endpoint for each virtual machine is disconnected from the host and the guests speak raw PCI to the device through the virtual boundary, which does not exist in the AP chipsets today), and instead require the creating of virtual "tap" interfaces unique for the guest, which can be bridged or routed in the host but not directly connected.

Example Embodiment—Properly Virtualized Wlans

To overcome the problems described in the preceding sections, in one embodiment of the inventions of this disclosure, a wireless network system may comprise a set of one or more wireless radios, and a set of software programs for the wireless network system comprising a data structure digitally stored in memory and representing the set of one or more wireless radios, and a virtualization module that registers one or more virtualized data structure representing a virtual proxy of the set of one or more wireless radios. The virtualization module creates one or more network endpoints representing an underlying virtualization granularity.

Figure 2:
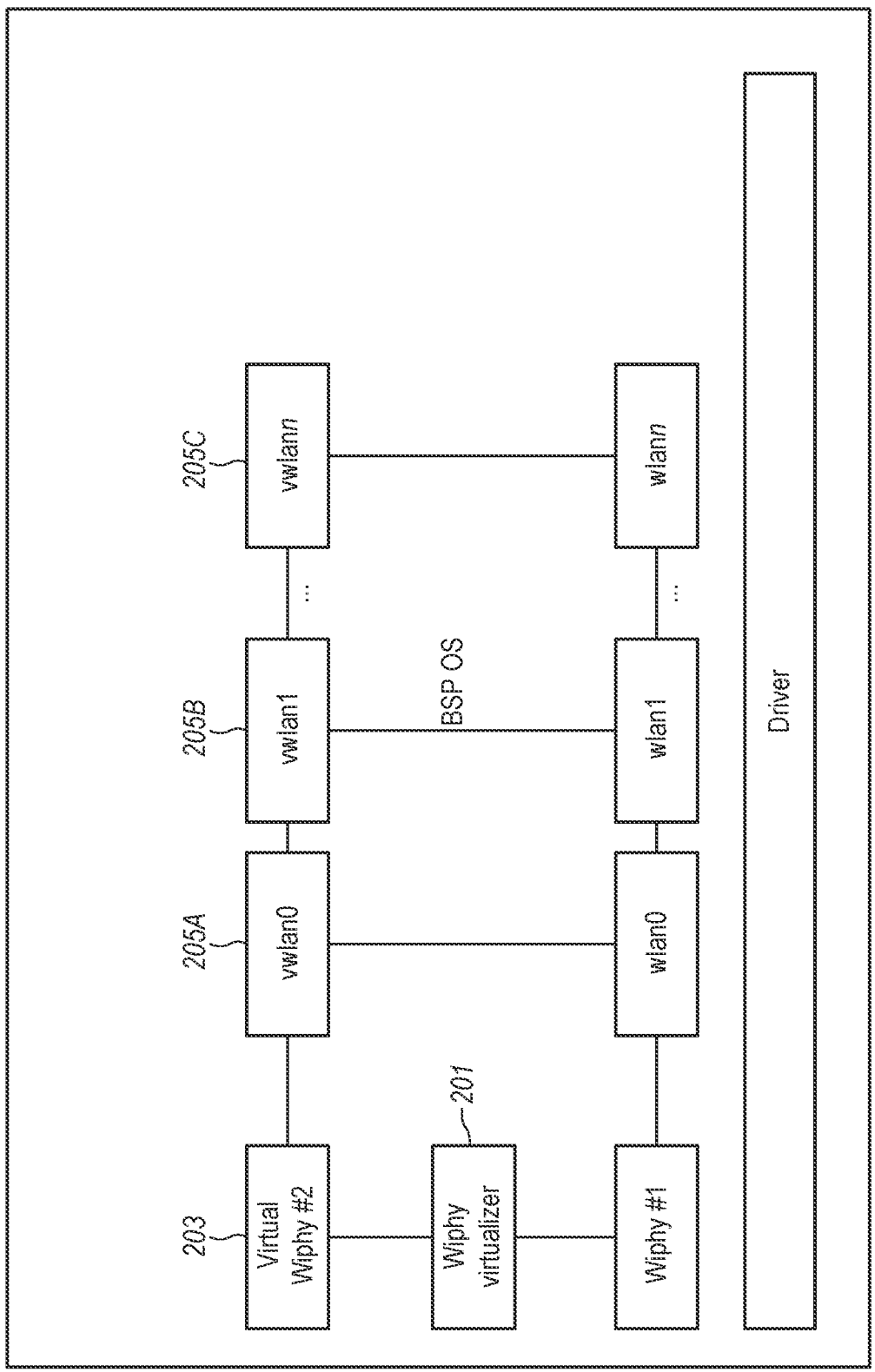
FIG. 2 illustrates an example logical architecture of an Operating System (OS) comprising a wiphy virtualizer.

FIG. 2 illustrates an example logical architecture 200 of an OS comprising a wiphy virtualizer. As an example, and not by way of limitation, illustrated in FIG. 2, an OS 200 may comprise a wiphy virtualizer 201 that may register a new virtual wiphy 203, within the API (such as cfg80211), to represent a virtual proxy for the real hardware. The wiphy virtualizer 201 may also create one or more network endpoints 205A, 205B, 205C representing the underlying virtualization granularity. In some embodiments, the virtualization granularity may be at the level of the BSS. A virtual wireless network may have one or more distinct BSSs (and BSSIDs) from other virtual networks.

Figure 3:
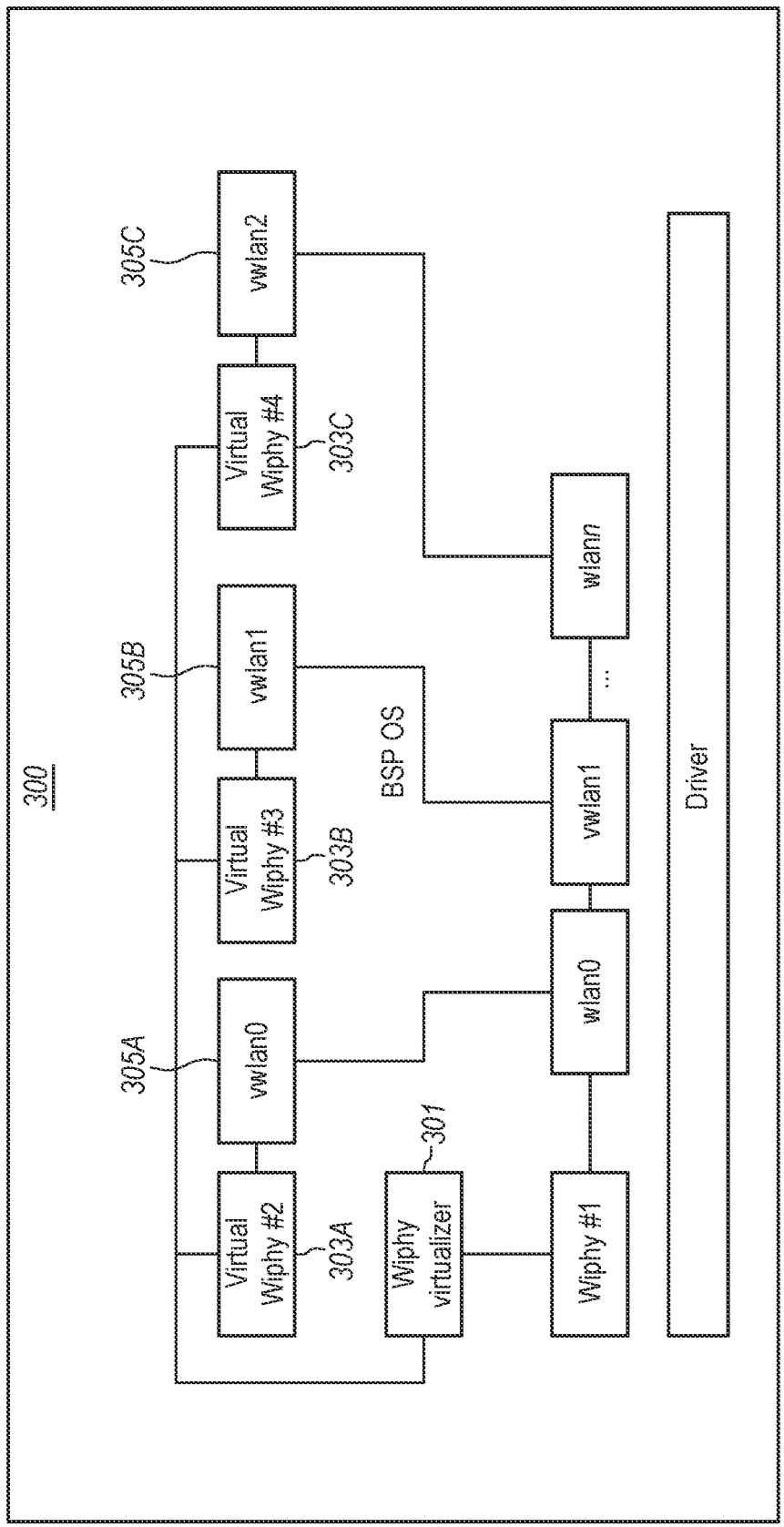
FIG. 3 illustrates an example logical architecture of an OS, in which each unique BSS has its own virtual wiphy.

In particular embodiments, each of the one or more endpoints may be associated with a corresponding virtual data structure. FIG. 3 illustrates an example logical architecture 300 of an OS, in which each unique BSS has its own virtual wiphy. As an example, and not by way of limitation, illustrated in FIG. 3, each of the Virtual WLANs (VWLANs) 305A, 305B, 305C may be associated with a BSS. A VWLAN may be associated with a virtual wiphy 303A, 303B, 303C. An advantage of doing this may be that each BSS is abstracted at a level that can be inserted into its own Linux container (by inserting it into its own unique network namespace). In some embodiments, the wiphy virtualizer 301 may query the original wiphy for its state and copying the relevant sections into the virtual wiphys 303A, 303B, and 303C. In some embodiments, the relevant sections may include the available regulatory bands and channels, the power requirements, the interface modes that the underlying driver supports (AP, client, monitor, etc.), and the available list or mask of BSSID addresses that can be used. In some embodiments, the wiphy virtualizer 301 may keep track of the number of interface combinations supported by the driver and may adjust the numbers exposed by the virtual wiphys 303A, 303B, 303C to prevent their users from exceeding the limits. In some embodiments, the wiphy virtualizer 301 may not adjust the values. In such a case, an attempt to exceed the limits may produce an error. In some embodiments, the wiphy virtualizer 301 may directly query the underlying in-memory wiphy structure for the physical wiphy. In Linux, this can be reached by accessing the real device's net_device structure's ieee80211_ptr field, which points to the wireless_dev structure and thus the wiphy structure.

In some embodiments, the query may be transmitted whenever the virtual wiphy 303A, 303B, or 303C is accessed, by placing read prohibition protection on the page the virtual wiphy structure resides and intercepting the read fault to schedule an update. In some embodiments, a virtual wiphy 303A, 303B, or 303C may be copied only on first creation. In some embodiments, the virtual wiphy 303A, 303B, or 303C may be periodically copied from the real one. Note that perfect synchronicity is not usually required in the management of wireless networking. In general, drivers do not change wiphys once registered, except by the explicit request of the user space software. Even when the user space software makes an explicit request, the request may tend to be limited to major addressing or regulatory changes only— not for usual operation—so the degree of copying is an issue only in specialized environment. In environments where those changes can be prevented, the synchronization may only need to be done once.

Figure 4:
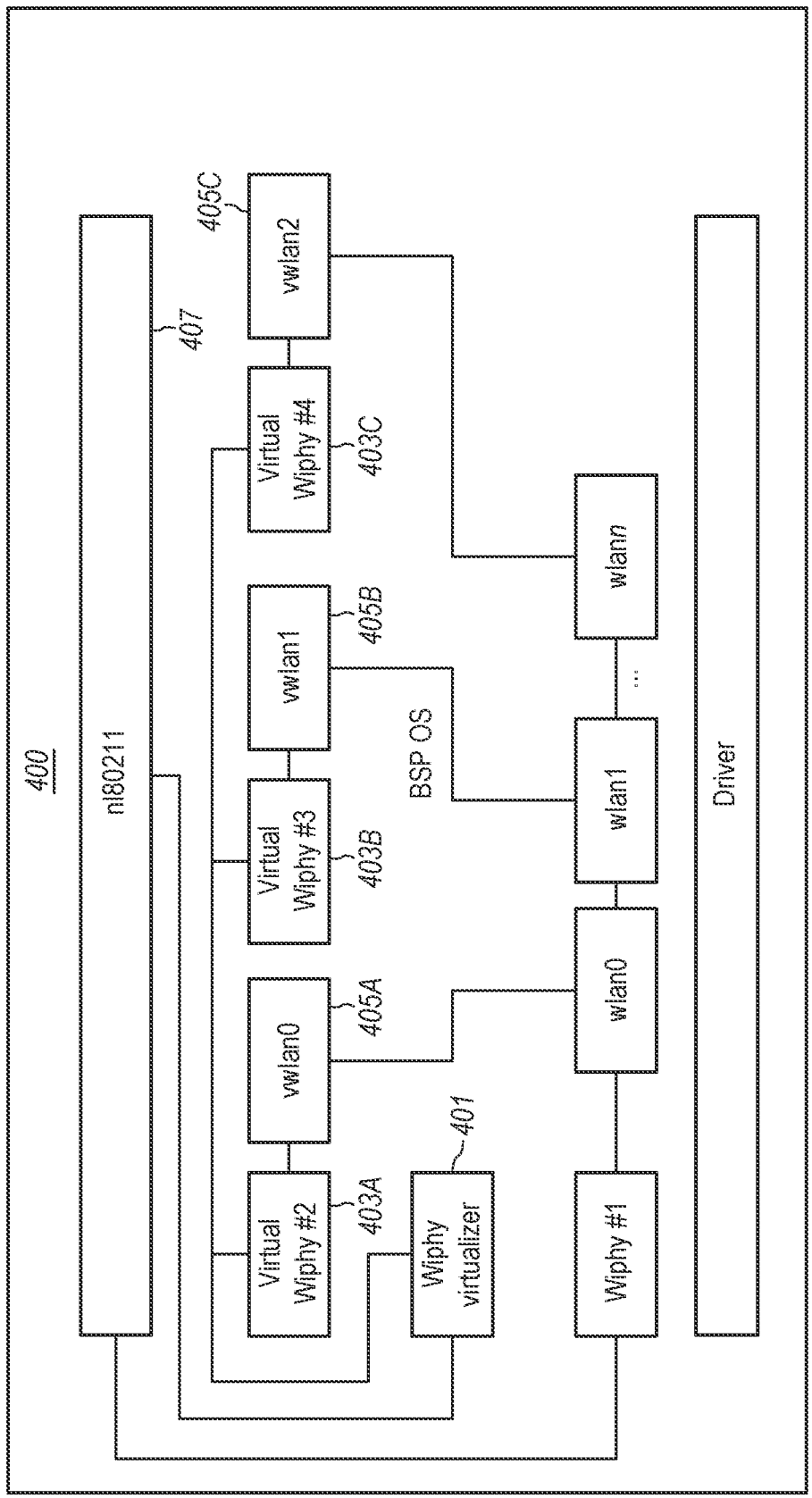
FIG. 4 illustrates an example logical architecture of an OS, in which kernel virtualization is used.

In particular embodiments, the one or more virtualized data structures may be indirectly accessed through a user space interface, e.g., a netlink nl80211 socket. FIG. 4 illustrates an example logical architecture 400 of an OS, in which the kernel virtualization is used. As an example, and not by way of limitation, illustrated in FIG. 4, In some embodiments, the virtual wiphys 403A, 403B, 403C may be accessed using a netlink nl80211 socket 407. The nl80211 socket 407 may be created by using standard kernel socket means to register as a non-zero pid entity. This may be done by arbitrarily choosing a nl80211 port ID, or by registering a kernel thread and using the pid of the kernel thread. This may also allow the wiphy virtualizer 401 to subscribe to updates from the nl80211 stack, such as the registration of new virtual wiphys 403A, 403B, 403C and interfaces 405A, 405B, 405C, automatically, without having to modify the cfg80211 code.

Figure 5:
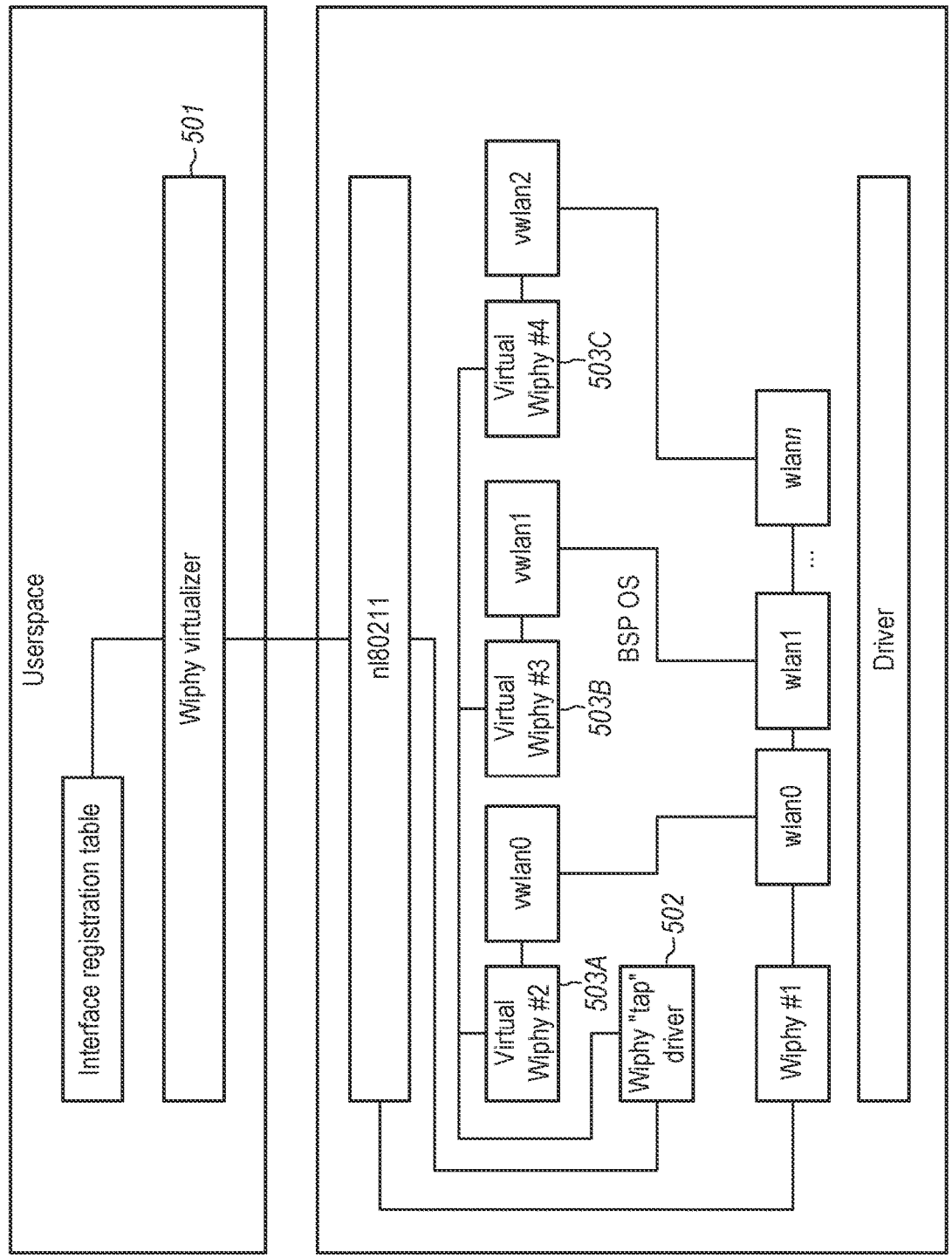
FIG. 5 illustrates an example logical architecture of an OS comprising a wiphy tap driver.

In particular embodiments, the virtualization module may reside in user space. The virtualization module may register the one or more virtualized data structure through a tap driver. FIG. 5 illustrates an example logical architecture of an OS comprising a wiphy tap driver. As an example, and not by way of limitation, illustrated in FIG. 5, a blank wiphy may be created. The blank wiphy may be edited from user space. This may also allow a user space program to create a dummy wiphy as well, and register for the access to the dummy wiphy, in effect creating a form of a wireless tap driver 502. In particular embodiments, the user space program may be a wiphy virtualizer 501. The user space process can have the benefit of being in a less risky domain, from a crashing perspective, and can take advantage of scripting and other rapid programming methodologies to produce arbitrarily complex behavior of the virtualization without requiring kernel code changes.

In particular embodiments, the virtualization module in the user space may exercise one or more commands for changing state of the one or more virtualized data structures through a user space interface, e.g., nl80211 socket. The commands may comprise adding or removing interfaces, starting new BSSs, changing the keys for stations, adjusting power and antennas, changing channels, starting scans, requesting radar detection, adjusting the association handshake, or any suitable commands. In particular embodiments, the wiphy may be companioned with the commands for changing the state of the wireless device, such as creating a new interface. In Linux, the list of commands may be represented in the kernel by the cfg80211 ops structure of callbacks that the driver registers with the cfg80211 stack for configuring both the wiphy and individual interfaces on the wiphy. In user space, the list of commands may be represented by the various nl80211 commands listed in nl80211.h. The commands may include adding or removing interfaces, starting new BSSs, changing the keys for stations, adjusting power and antennas, changing channels, starting scans, requesting radar detection, adjusting the association handshake, or any suitable commands. Most of these callbacks may be exercised from user space through nl80211, so that the security authenticator—hostapd traditionally—can implement the various 802.11 and Wi-Fi Alliance protocols for handshakes, authorization, key exchange, network management, resource management, and other sundry tools. For a wireless network to be effective, these requests on a virtual wiphy 503A, 503B, 503C need to be proxied to the underlying physical wiphy.

Figure 6:
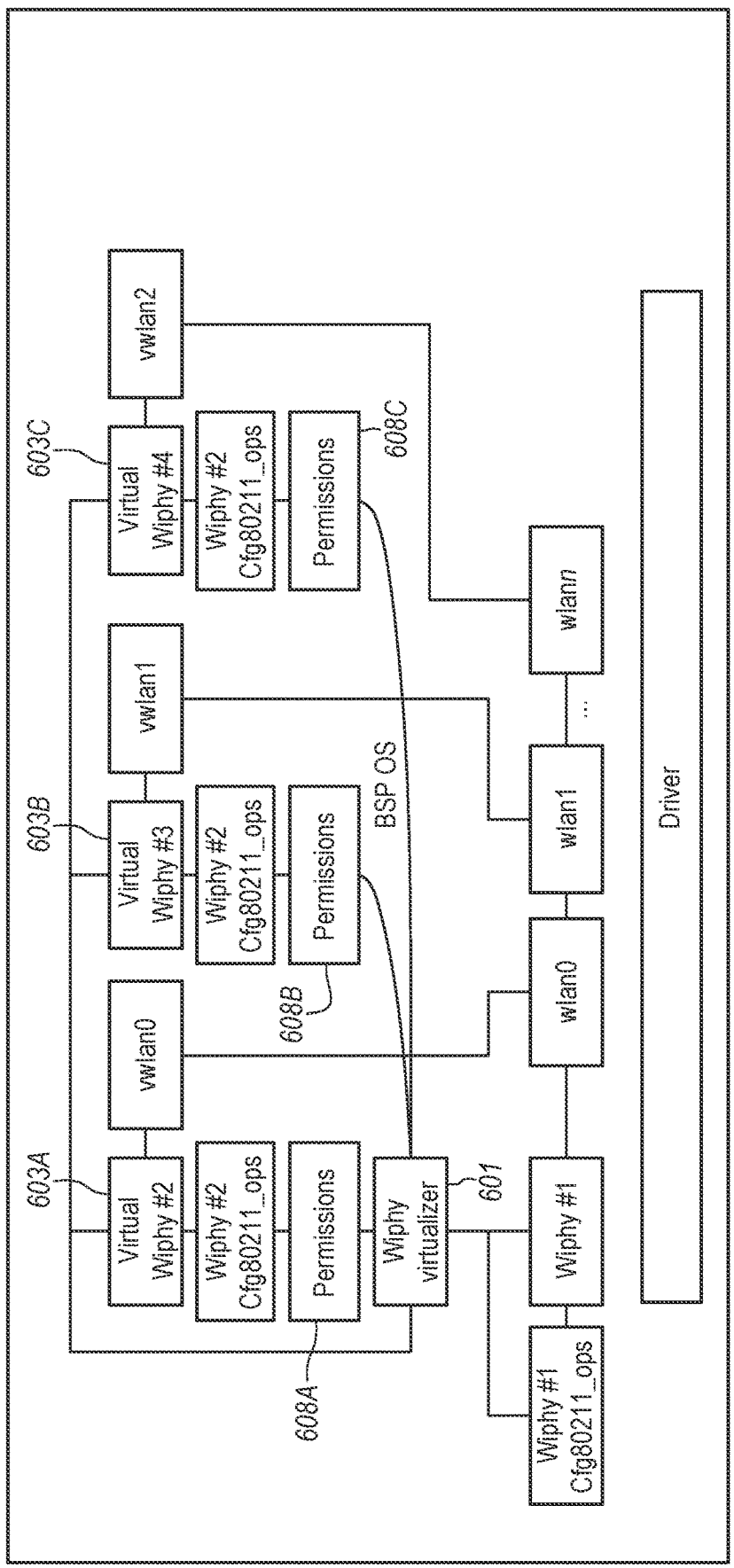
FIG. 6 illustrates an example logical architecture of an OS where each virtual wiphy has a virtual cfg80211 ops configuration registration.

In particular embodiments, the set of software for the wireless network system may further comprise a permission module associated with the virtualization module that may maintain allocated resources to one of the one or more virtualized data structure and allows changes to the one of the one or more virtualized data structure within limits of the allocated resources. FIG. 6 illustrates an example logical architecture of an OS where each virtual wiphy is associated with a permission module. In some embodiments, a central permissions module may exist. In some embodiments, such as illustrated in FIG. 6, a unique permissions module 608A, 608B, 608C may exist for each virtual wiphy 603A, 603B, 603C. The permissions module 608A, 608B, 608C may decide which commands are able to be passed through and which must fail. The permissions module 608A, 608B, 608C may ensure that the physicality of the real world—the channel and regulatory state, for example, of the radio—is properly passed on to the real world and back. The most naïve permissions system is to reject all changes to the wiphy. However, the cfg80211 ops APIs encompass not only wiphy changes, but also adjustments to the operation of the individual BSSs. In some configurations, the state that can be changed per-BSS without interfering with a neighboring wireless network collocated on the same radio is handled by the wiphy virtualizer 601. For example, within a virtual domain, the state of the assigned stations—keys, association state—may need to be handled. Furthermore, the configuration of the BSS itself—SSID name, QoS parameters, and so on—may need to be dealt with. The permissions system in most cases may grant that access by proxying the API call to the real wiphy's cfg80211 ops, thus causing the underlying driver to make those changes. In some configurations, each virtual wiphy 603A, 603B, 603C may be allowed to create multiple VWLAN interfaces (a monitor interface, multiple VLAN interfaces, or new BSSIDs, for example). The permissions module 608A, 608B, 608C may allow those changes through within the enforced resource limits that the permissions module 608A, 608B, 608C carries. The permissions module 608A, 608B, 608C in some embodiments may pre-allocate resources for the associated virtual wiphy 603A, 603B, 603C. In other embodiments, the resources are measured at real time. This mirrors the resource monitoring that occurs in data center virtualization—for example, CPU cores might be preassigned, but memory may be overcommitted and sharable. When the operation is not allowed, the permissions system may respond with an appropriate error code—ENOMEM, EPERM, EIO, and others can be used, depending on the desired behavior of the overlying user space infrastructure.

Figure 7:
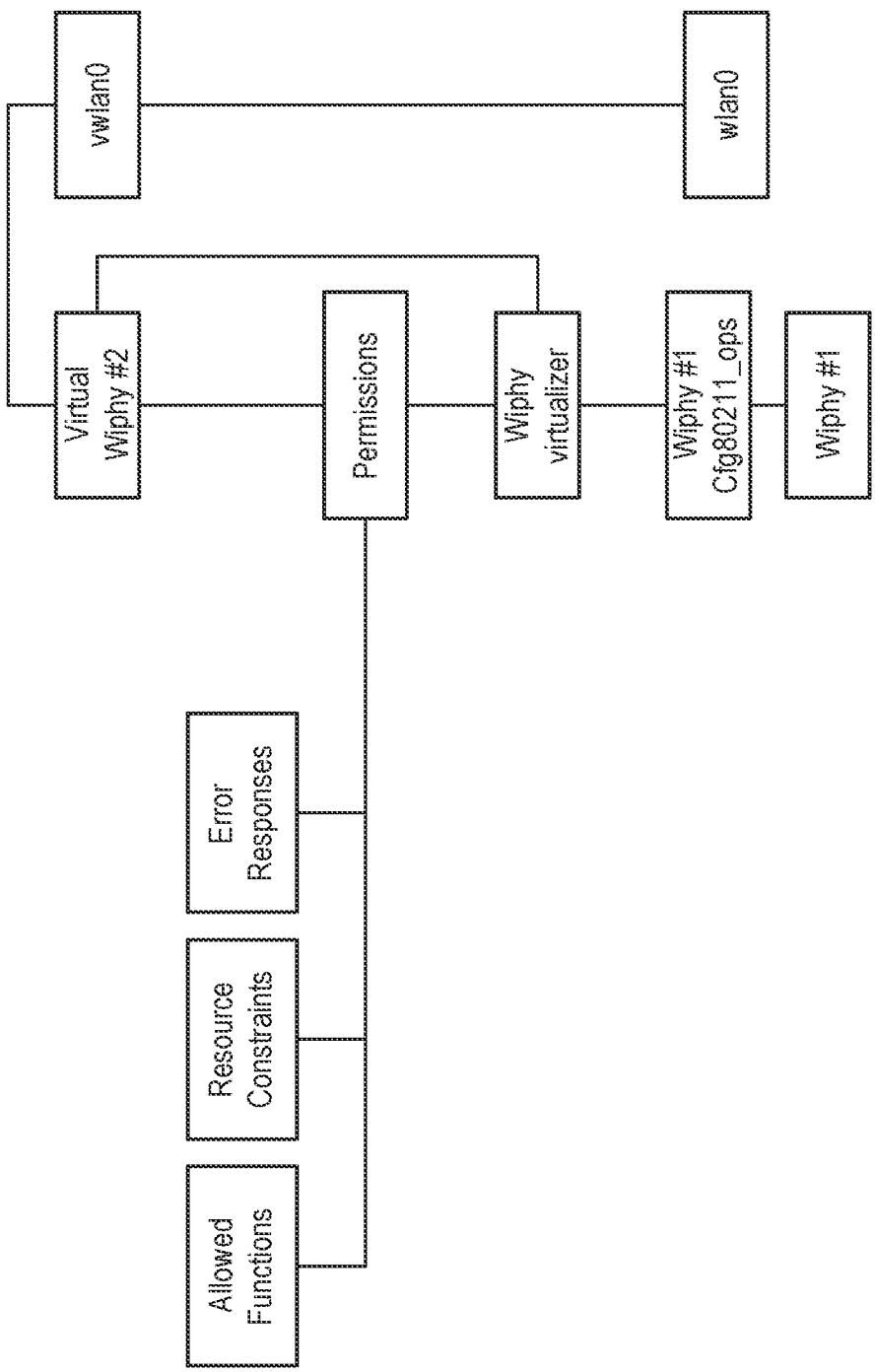
FIG. 7 illustrates an example implementation for a permissions module.

In particular embodiments, the permission module maps each possible operation to allowed behaviors, resource constraints, and responses for failure. FIG. 7 illustrates an example implementation for a permissions module. In some embodiments, the permissions are per groups of interrelated functions, such as adding and removing interfaces. FIG. 8 illustrates an example mapping table of operations to allowance, resource constraints, and error codes. The contents of the table may be set by any combination of administrator desire (such as pre-allocation of resources or limits on resource sharing), knowledge of the driver capability (such as whether the driver allows independent BSSs to have independent state, or whether a change made in one changes all), and the degree to which it is desired for the virtual wiphys to be independent.

In particular embodiments, each of the one or more virtualized data structures may be associated with a priority for a command for controlling the set of one or more wireless radios such that a command associated with a virtualized data structure of a higher priority may take precedence over a command associated with a virtualized data structure of a lower priority. In some deployment environments, it may be desirable for some virtual wiphys to be able to control the radio more than others. In some embodiments, each virtual wiphy may be assigned a priority for a command: in some, only the highest priority wiphy present can have control; in some, requests for resources from higher priority wiphys take precedence over lower ones, such as allowing a higher priority wiphy to request a scan and cancelling the scan of the lower one. In some embodiments, the wiphy virtualizer may pass the accepted requests through directly to the driver. Thus, the permission system may be used to block the requests that would interfere in an unacceptable way. In some embodiments, the wiphy virtualizer may virtualize the configuration. For example, the wiphy virtualizer may allow scans no more than once a minute. If one virtual wiphy requests a scan, it could be granted, but the second request from another virtual wiphy that would cause the scan to exceed the rate could be merged in with the first request, creating one scan that covers both channel lists. This could be done by canceling the first scan if it hasn't happened yet and creating a new merged one. For another example, if the driver requires QoS mappings to be consistent within the radio, but the wiphy virtualizer is virtualizing QoS mappings, the wiphy virtualizer may accept and remember the per-virtual-wiphy mappings. The wiphy virtualizer may modify the Differentiated Services Code Point (DSCP) codes or the priority fields of the skbs as traffic is passed through the virtual interfaces, to adapt the codes to the underlying mapping the driver actually possesses.

The control plane flow for the interfaces has been disclosed so far. The data plane can also be established.

Figure 9:
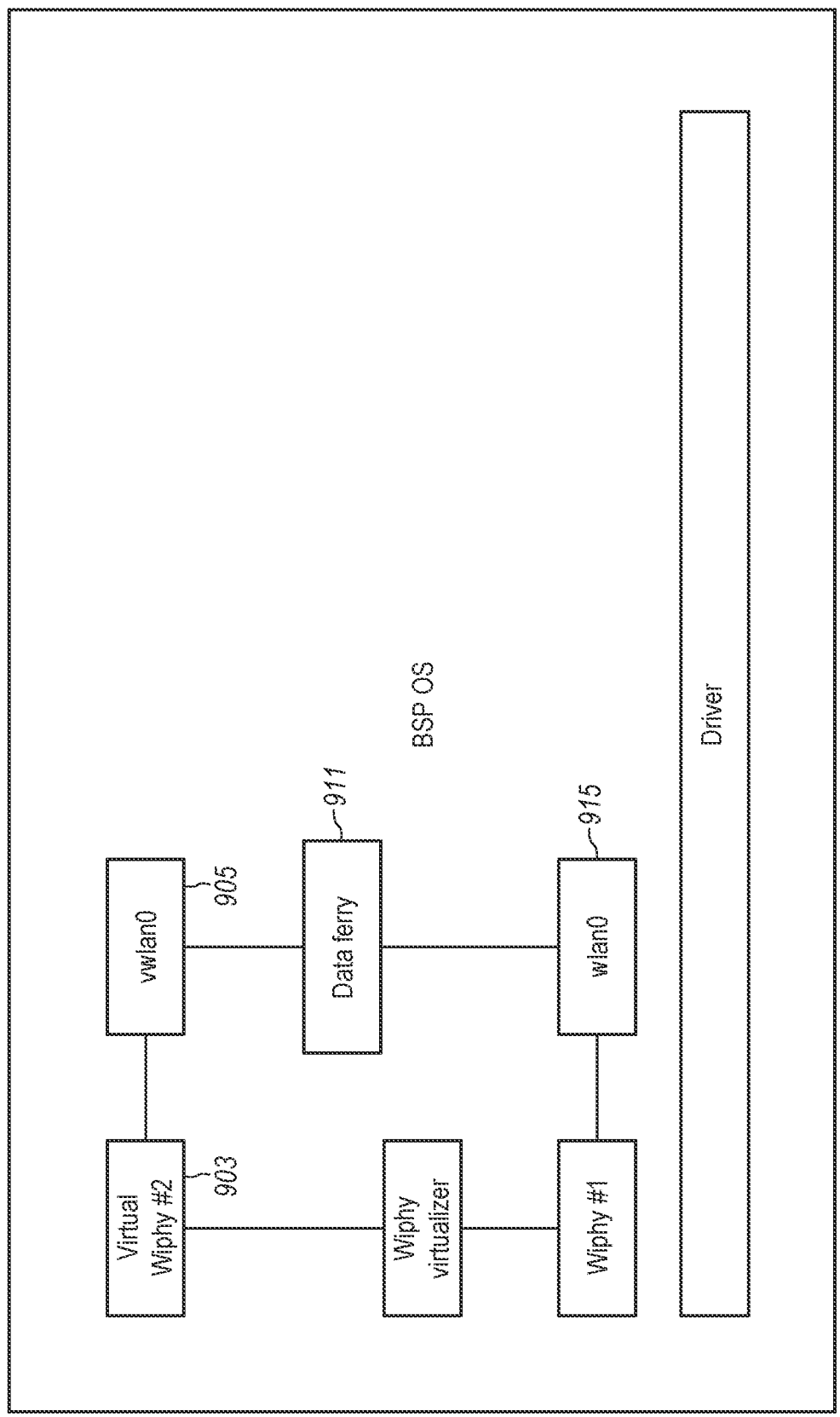
FIG. 9 illustrates an example logical architecture of an OS comprising a data plane ferry.

In particular embodiments, the set of software for the wireless network system may comprise a data plane ferry that relays traffic between a driver's interface and a virtual interface associated with one of the one or more virtualized data structure. FIG. 9 illustrates an example logical architecture of an OS comprising a data plane ferry. As an example, and not by way of limitation, illustrated in FIG. 9, a data plane ferry 911 may steal the received traffic from a driver's interface 915 and present the received traffic to a virtual interface 905 associated with a virtual wiphy 903. This can be done by registering with the receive queuing infrastructure at many different levels. In some embodiments, the packets may be harvested by using an ebtables-controllable filter applied to the interface. In some embodiments, the packets may be harvested by registering as if the data plane ferry 911 were the VLAN module or the bridge module. In other embodiments, the local Data Plane Development Kit (DPDK) engine may be configured to relay the traffic. These captured frames are copied shallowly (just the kernel control structure and not the actual bytes of the frames) and then marked as received to the kernel on the virtual wiphy interfaces 905 in some embodiments. For transmission on the virtual wiphy interfaces 905, a similar process can occur, where packets marked as transmitted may be just ferried directly to the real interfaces 915.

Figure 10:
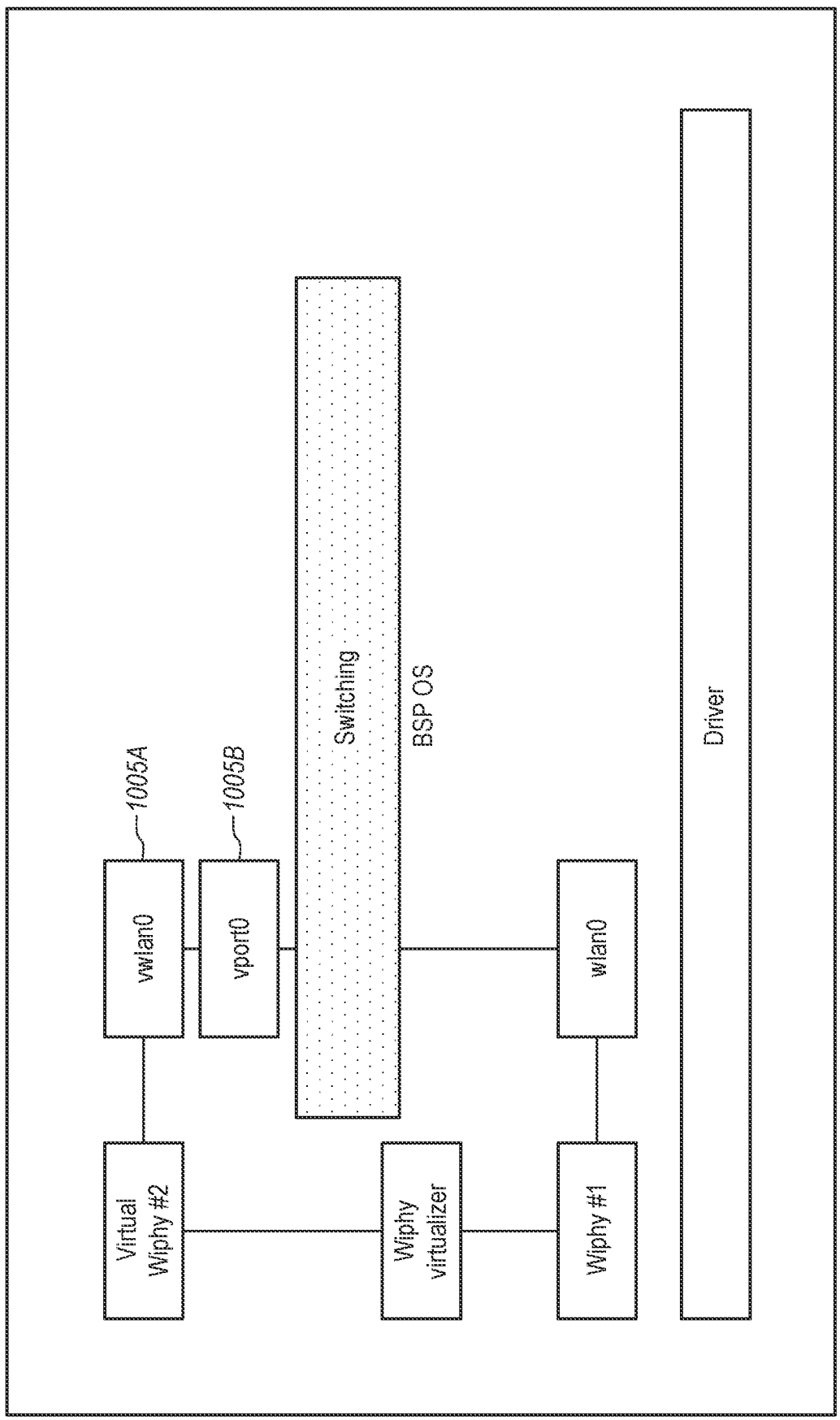
FIG. 10 illustrates an example logical architecture of an OS comprising paired virtual interfaces associated with a virtual wiphy.

In particular embodiments, the set of software for the wireless network system may comprise a pair of virtual interfaces that may be associated with one of the one or more virtual data structure. FIG. 10 illustrates an example logical architecture of an OS comprising a paired virtual interfaces associated with a virtual wiphy. As an example, and not by way of limitation, illustrated in FIG. 10, the wiphy virtual interfaces 1005A, 1005B appear as pairs, with an upper-facing interface 1005A that can be introduced into a separate namespace than the lower-facing interface 1005B. Every packet sent on the upper interface (say, vwlan0) 1005A may be presented on the lower interface (say, vport0) 1005B as a receive and vice versa. This approach may allow any number of Linux bridging/switching configurations, such as DPDK for efficient processing, host bridging, or OpenVSwitch, to be plumbed in at the bottom level, while still allowing a completely separate stack of virtualized network functions to be applied at the upper level. An advantage of allowing the intervening host-side data switch may be that advanced features can be performed for wireless traffic.

Figure 11:
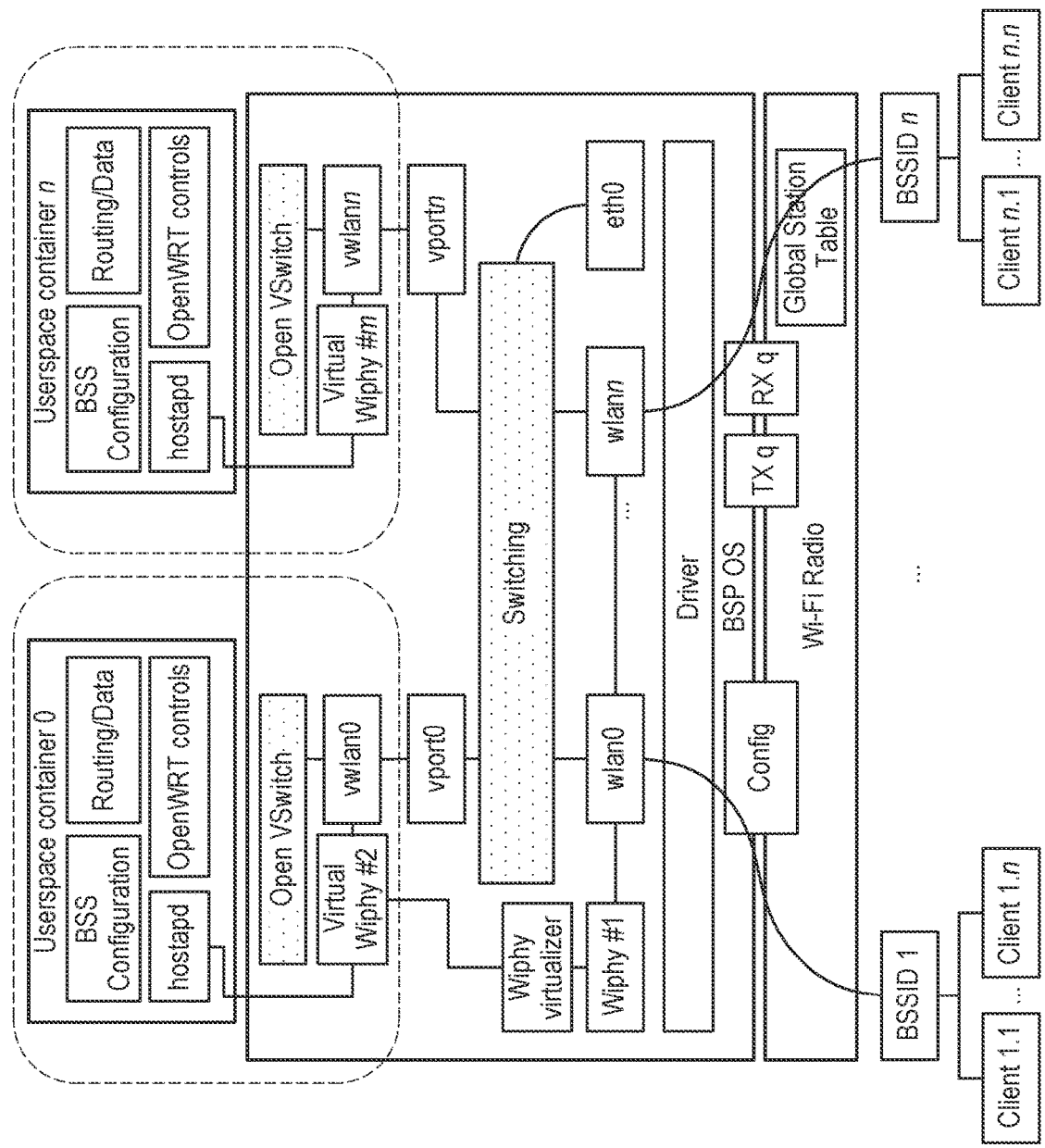
FIG. 11 illustrates an example logical architecture for utilizing multiple containers as a segregation mechanism.

In particular embodiments, the virtualization module may register a virtualized data structure isolated in a virtualization container. FIG. 11 illustrates an example logical architecture for utilizing multiple containers as a segregation mechanism. Linux containers are used to give each running instance of a user space platform an illusion that the instance is running alone on the system. LXC and DOCKER are two well-known methods of implementing containerization. Each container may be given, in its own separate net namespace, its own virtual wiphy with as many interfaces as it configures. The network namespace difference may ensure that whatever configuration commands the containers give are trapped to their own containers, as depicted with the dotted line in FIG. 11. Within each net namespace, the container may be allowed to configure its own data path. This can be particularly useful, such as when the data path is connected to a distributed, tunneled OpenVSwitch instance, or to other tunnel protocols. Such configurations belong with the configuration, such as OpenWRT, but can now be truly hosted side-by-side with other independent services. The architecture illustrated in FIG. 11 may work for other data plane processing embodiments as well: packet stealing still allows for the containerization behavior, and by having a direct connection, the per-packet overhead can be bounded and reasoned about as having an O(1) influence on the running time of the system. An advantage of using containers (and virtual machines, below, as well) is that the virtualization or isolation of the wireline interfaces allows the operator to introduce, transparently to the workload, a secure overlay for traffic, and thus ensure that no wired traffic is ever placed in the wrong area.

Marrying CPU and Wi-Fi Virtualization

A downside of containers may be that the container image is still dependent on the kernel version running on the board support package. This may be a problem, as every silicon vendor may have different kernel versions they ship with. The different kernel versions may only qualify the drivers for those versions. However, the contained software may wish to take advantage of different kernel capabilities. Furthermore, the contained image may itself wish to have access to other virtual hardware. Finally, the overall host operator may wish to prevent access to hardware that Linux containers do not protect against. Linux containers were designed for a single-tenant data center. Linux containers may not protect against access to the novel hardware that the embedded platforms have. Reducing the security perimeter to a deny-by-default model, such as present in standard CPU virtualization, may be advantageous in less trusted or adversarial multi-tenant environments. CPU virtualization may allow for workloads to be frozen and migrated bit-by-bit from one machine to another.

Figure 12:
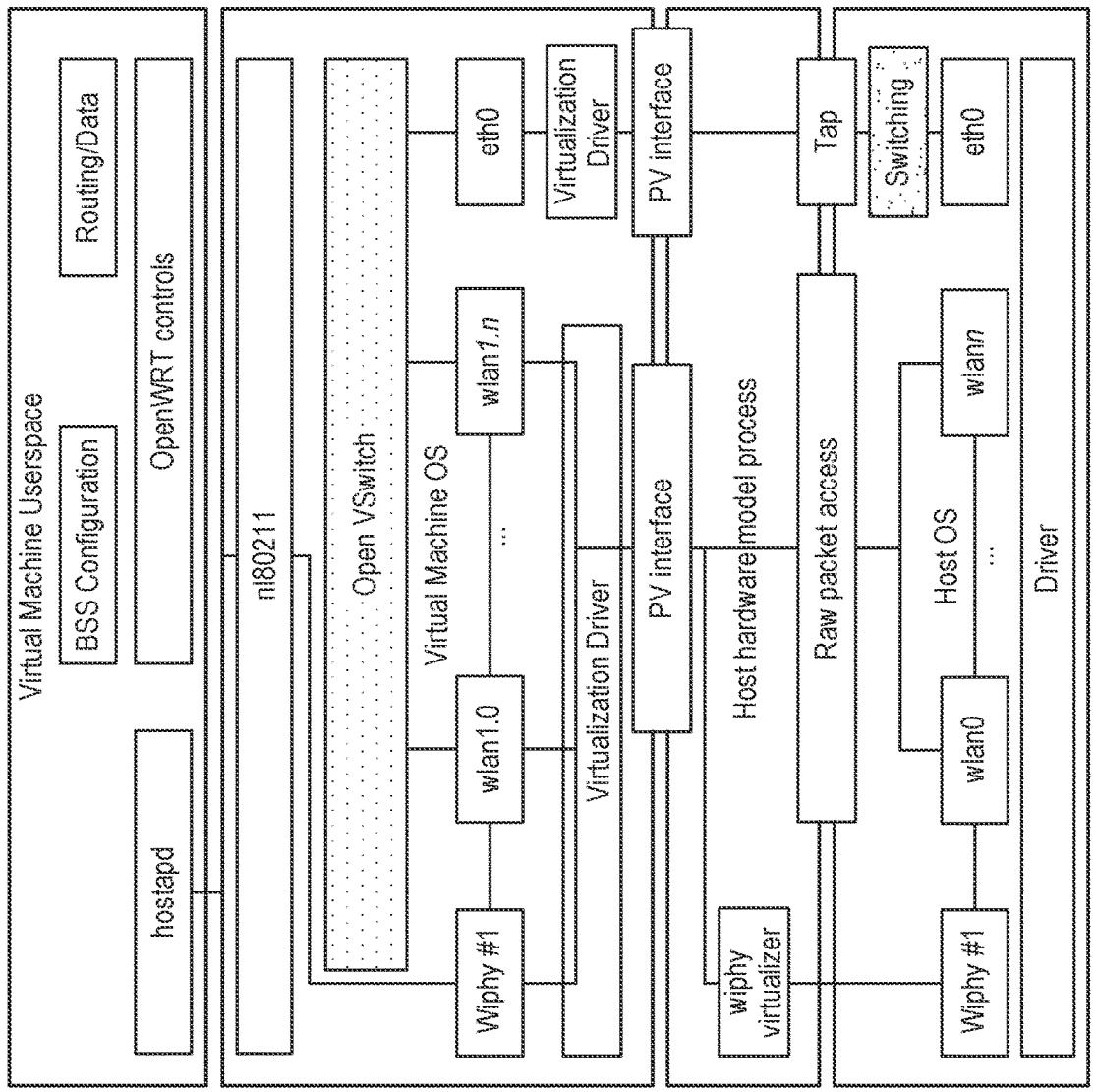
FIG. 12 illustrates an example logical architecture for virtualization.

In particular embodiments, the virtualization module may be placed in a host hardware model process while the one or more virtual data structures may be placed within a virtual machine. The virtualization module may bridge connections between the one or more virtual data structures and a real data structure representing the set of one or more wireless radios. FIG. 12 illustrates an example logical architecture for virtualization. In some embodiments, the virtualization engine may be KVM. The host hardware model process occurs inside qemu using virtio and vhost_net drivers. In some embodiments, the virtualization engine may be Xen using paravirtual access. A wiphy virtualizer is placed inside the host hardware model process that performs the hardware model emulation for a guest. The wiphy virtualizer may bridge the connections between the virtual wiphy and the real one in the manners taught above. Because the host hardware model process is in user space, one choice is to use nl80211 netlink sockets to make that communication. For accessing the data plane, Linux may provide raw packet access, through standard raw sockets, or memory mapped raw sockets as what is used by DPDK to efficient gain access to the queuing infrastructure. This may correspond to the stolen access model for within-kernel access but using user space to gain that access. Because this approach is user space-to-kernel access, there is no modification need in the host OS or virtual machine OS in these embodiments. However, the data access model may be different for wireless than wired, as wired access almost uniformly uses a tap virtual interface to allow for arbitrary traffic alteration and routing in the host OS. In some environments, this may be a specific advantage, as the direct access reduces the number of times each wireless packet has to be touched. However, the guest kernel does need to be modified—or rather, a special virtio-net driver is needed to perform the cfg80211 functions of registering the wiphy and taking the cfg80211 calls. In some embodiments, the wiphy may be communicated using shared memory with the hardware model process, and commands may be bridged using a control queue to the same device. In other embodiments, the guest driver may convert them directly to nl80211 commands and then presents those commands through the paravirtualization hardware queue into the host process for querying. The host hardware device model process handles the permissions, as disclosed above, in many embodiments.

Figure 13:
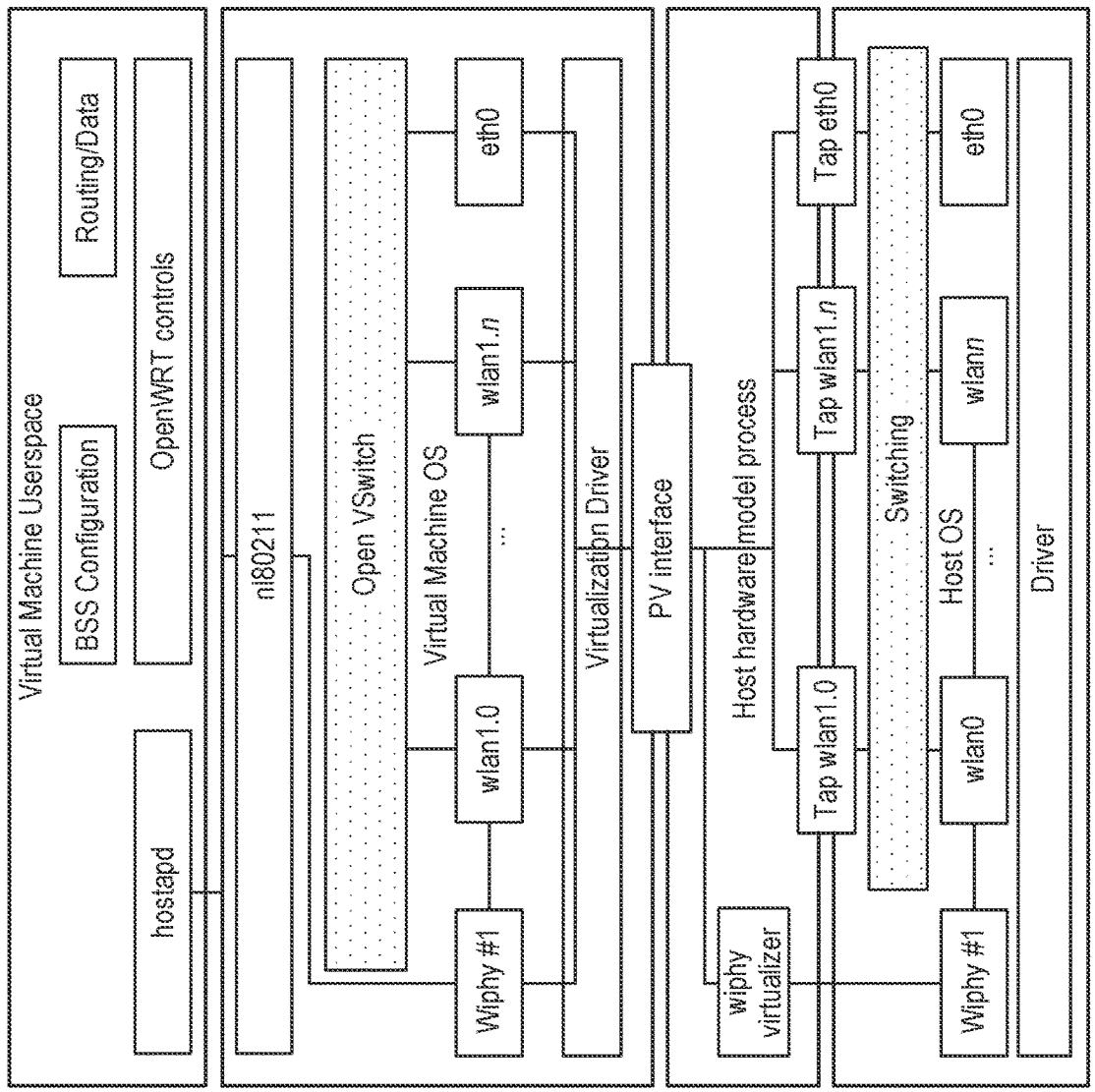
FIG. 13 illustrates an example logical architecture for virtualization utilizing a tap infrastructure to allow switching to occur within a host.

FIG. 13 illustrates an example logical architecture for virtualization utilizing a tap infrastructure to allow switching to occur within a host. The host kernel may be still unmodified. However, instead of using raw packet capture (as the Switching block does, for example), the traffic may be allowed to flow through the bottom switching block and into the same tap interfaces. In some embodiments, one tap interface may exist for each virtual wlan1.x interface in the guest. In some embodiments, the tap interface may be shared. The traffic may be routed by the hardware model based on the BSSID the station is associated to, as discovered by the wiphy virtualizer. An advantage of either method may be that the host switching infrastructure can perform advanced additional alteration of the traffic, just as with the equivalent container model.

Figure 14:
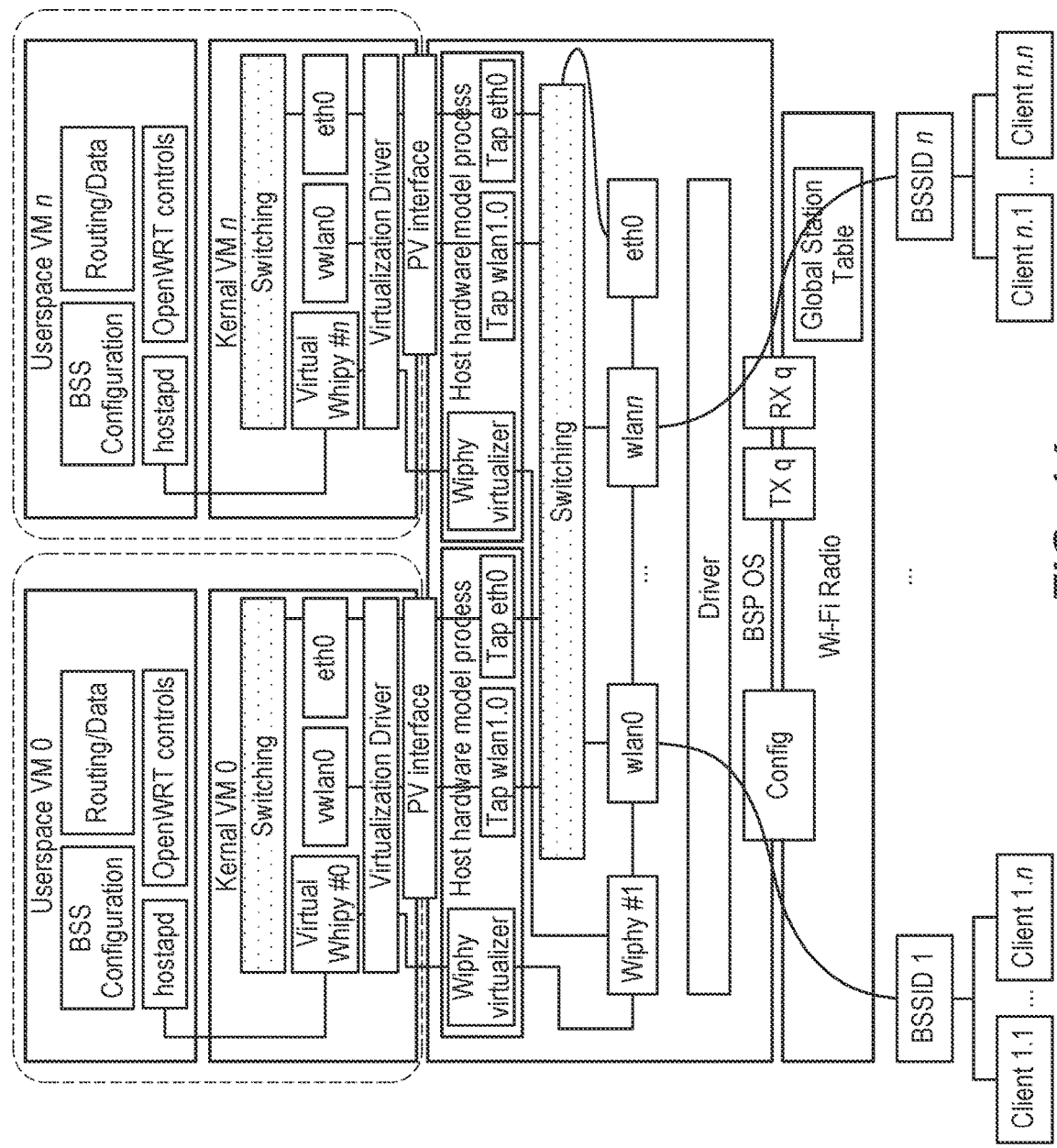
FIG. 14 illustrates an example logical architecture for full virtualization.

FIG. 14 illustrates an example logical architecture for full virtualization, illustrating the complete connection into the radio state. In this model, one or more virtualized guest VMs are ran on a virtualizing host, where each tenant VM's radio interfaces that require a BSSID are connected logically to the underlying BSSID generating state and logic of the Wi-Fi radio software and hardware. For illustration, in some embodiments, a client connected to BSSID 1, represented natively by the likely virtualization-unaware Wi-Fi radio hardware and software as wlan0 in the host, has a data path through tap wlan1.0, and is thus exposed through VM 0's kernel via vwlan0. Other embodiments maintain the connection outside of tap on the host, such as a raw socket interface, packet encapsulation, tunnelling, or data forwarding, as mentioned herein. Maintaining a logical connection of BSSIDs in the host and guest allows the virtualization workload of the virtualizer to be reduced: the Wi-Fi protocol relies on the BSSID as a center of certain activities, especially security, and embodiments that mix two guests' separate networks on one BSSID perform extra steps to demultiplex the two networks, such as accessing the Global Station Table rather than relying on the driver's own demultiplexing.

Figure 15:
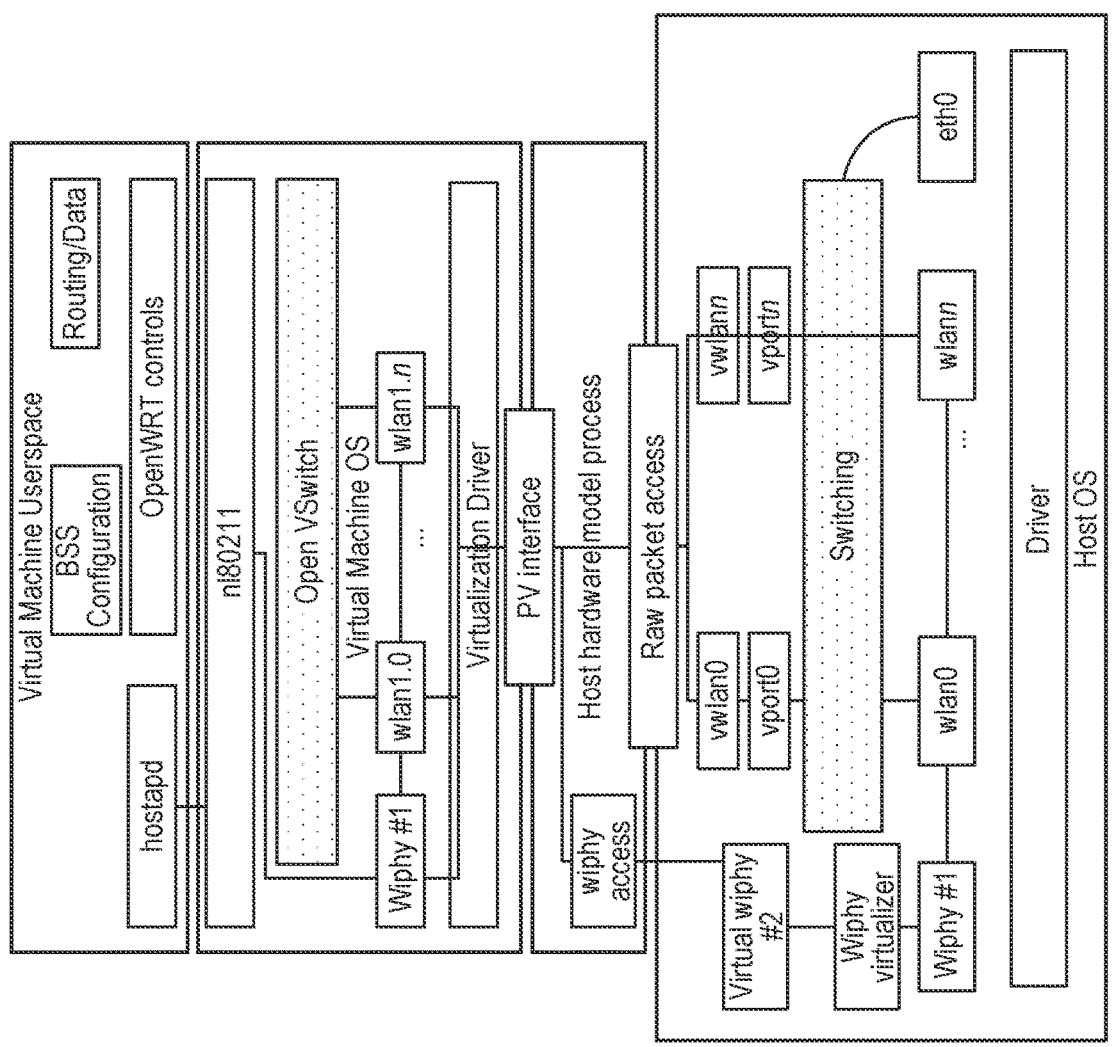
FIG. 15 illustrates an example logical architecture for virtualization having virtual wiphys in a host and having the wiphy in a guest.

In particular embodiments, one of the one or more virtual data structures may be on a host machine while the data structure may be on a virtual machine. FIG. 15 illustrates an example logical architecture for virtualization having virtual wiphys on a host and having the wiphy on a guest. The double virtualization illustrated in FIG. 15—the wiphy having a virtual copy in the host and the guest—may seem redundant. But this architecture may use the exact same plumbing for both containerized workloads and virtual machine workloads. Thus, the architecture may allow the efficiencies of containers with the option for elevation to a full virtual machine if needed. Other methods of virtualizing workloads may be available. Some embodiments may use application virtualization techniques. An application virtualizer may be a shim that sits between the user space guest program and the host. The application virtualizer may modify or redirect library and system calls. Some may be lightweight shims for creating relocatable packages. The challenge with off-the-shelf shims may be that the off-the-shelf shims do not proxy for netlink requests. However, an off-the-shelf shim that can proxy for netlink request may be one using full user-mode Linux. User-mode Linux may be a special version of the Linux kernel that runs as an unprivileged application, but registers as its "syscall layer" with the underlying host kernel to intercept every system call and have the operation performed in the context of the user-mode kernel. In user-mode Linux, the hardware model may be similar to that of containers in the most expansive case, as the kernel can pass through hardware requests, or the hardware model may be as limited as raw serial access alone, using its own trivial emulating drivers. In one embodiment, the user-mode Linux kernel may contain the wiphy virtualizer and perform user-mode access similar to the virtualization modes above. The benefits of user-mode Linux may be less clear when hardware-enabled CPU virtualization is available.

Remote Wi-Fi Access

One advantage of virtualizing the Wi-Fi interface may be that the processing needed to handle off-the-shelf wireless can be performed at a distance from the actual radio. This may not the same as "split-MAC" architectures, which use proprietary hooks or unusual and abandoned protocols (Control and Provisioning of Wireless Access Points (CAPWAP), for example) to communicate. The advantage may be that off-the-shelf workloads that today depend on having physical access to the radio can be performed instead over a distance.

Figure 16:
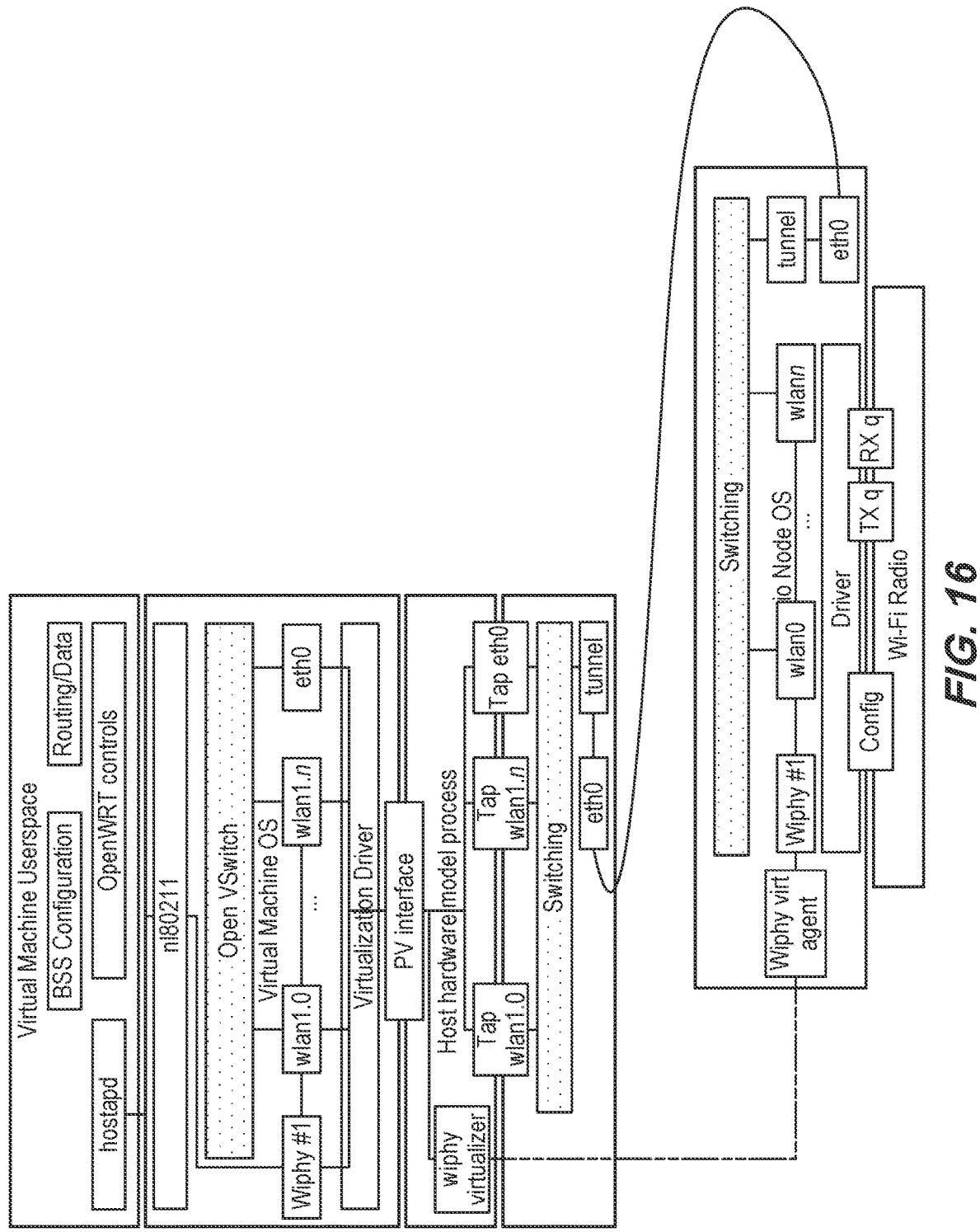
FIG. 16 illustrates an example logical architecture for remote Wi-Fi.

In particular embodiments, the virtualization module may be on a host hardware model process while the set of one or more wireless radios and the data structure representing the set of one or more wireless radios may be on a remote machine. A virtualization agent on the remote machine may configure and discover a state of the set of one or more wireless radios, which would be performed by the virtualization module if the virtualization module collocates with the set of one or more wireless radios. The virtualization agent on the remote machine and the virtualization module on the host hardware model process may communicate over a network. FIG. 16 illustrates an example logical architecture for remote Wi-Fi. The example illustrated in FIG. 16 uses virtual machine workloads, but any arbitrary workload may be used, so long as there is a wiphy virtualizer on the workload host. A wiphy virtualization agent may be introduced on the remote node. The wiphy virtualization agent may perform the role that the wiphy virtualizer does for configuring and discovering the state of the wireless radios when collocated. The wiphy virtualizer and the wiphy virtualization agent may communicate over the network using any available method: the line is shown direct and dashed to avoid convoluted physical routing of the link on the diagram from interfering with the understanding of the concept. The switching infrastructure on both nodes may be configured to ensure that traffic leaving the remote node's wireless interfaces on receive may be pushed through an overlay network into the switching infrastructure on the host node, and vice versa.

One of the advantages of this model may be that the communication from user space to kernel for Wi-Fi in Linux (such as hostapd), is not strictly timing critical but may be processing and especially memory intensive. The remote node can be simplified to the point of merely sending over packets and need not worry about providing enough headroom for captive portal, advanced security key generation (such as elliptic curves), timing analysis mitigation (often very expensive as modern security protocols tend to be particularly vulnerable), nor flexibility. The host can perform such tasks as heavy-duty captive portal work, authentication, and other network services without having to worry about overwhelming the radio node's CPU, so long as the network between the host and remote node is sufficient to carry the wiphy and cfg80211 traffic. Many off-the-shelf, and even custom (such as legacy) software packages for these services want to be local to the hostapd instance, which allows the software to have intimate access to the wireless state. For example, a proper multi-BSS Wi-Fi Passpoint/Hotspot 2.0 instance may need to operate a captive portal (or at least the routing for it) for new devices that are registering, which use a unique EAP-TLS access that disables client authentication, all over one BSS. Once a station is associated, it has to be handed into another BSS, that uses whatever EAP-based authentication the mobile operator requests. This is a complex, resource intensive application, yet needs to run, according to the prior art, directly on the radio node's CPU. But with the disclosed invention, the workload can now be transferred to the host, which has more resources.

Resource Allocation

Figure 17:
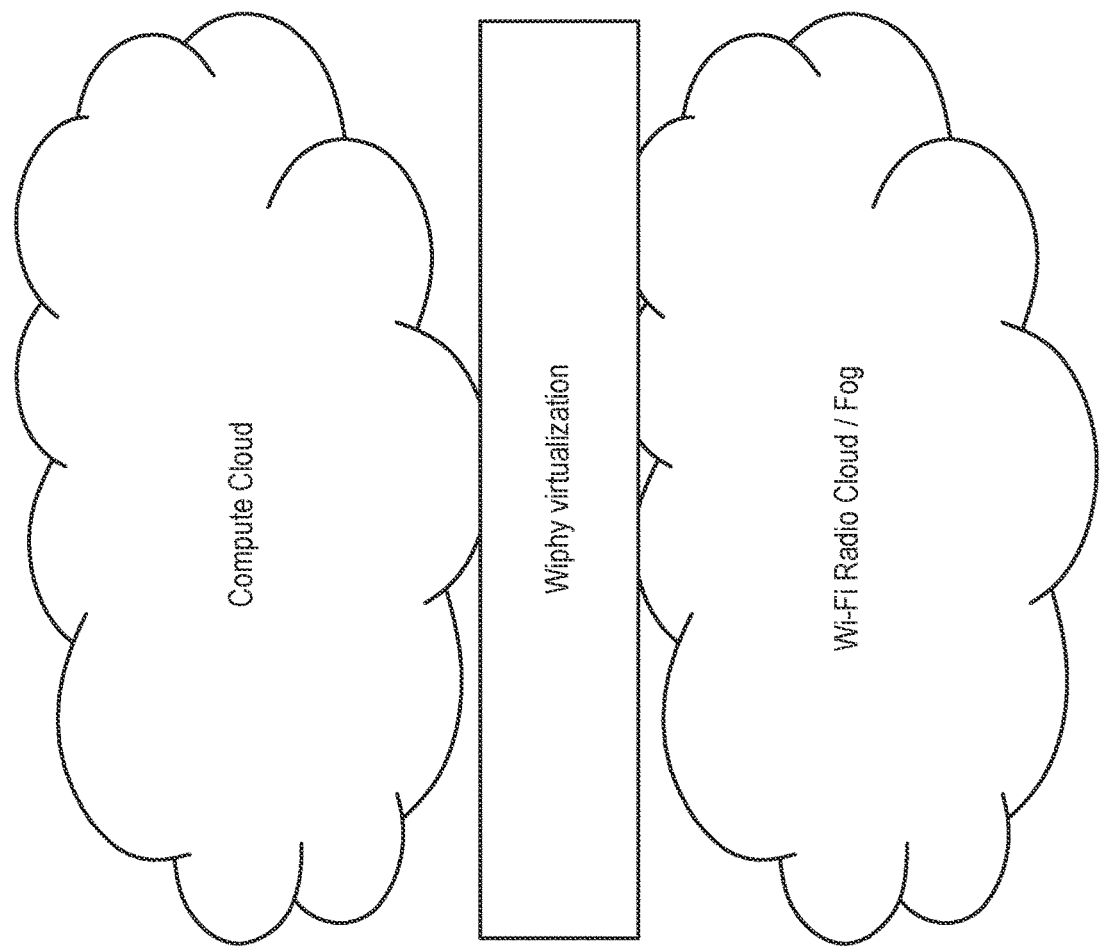
FIG. 17 illustrates example Wi-Fi clouds.

In particular embodiments, the virtualization module may be on a compute cloud while the virtualization agent and the set of one or more wireless radios may be on a radio cloud. FIG. 17 illustrates example Wi-Fi clouds. Because the wiphy virtualization allows workloads to be abstracted and relocated away from the physical wireless infrastructure, new Wi-Fi clouds illustrated in FIG. 17 becomes possible. The Wi-Fi radio cloud/fog (fog is often used for edge cloud computing) may comprise the physical nodes with the radios, and with CPUs that connect, as disclosed above, into the network with wiphy virtualization agents. The compute cloud may comprise compute nodes for arbitrary workloads and possess one or more wiphy virtualizers based on whether containerized or virtualized. Of course, the compute cloud resources can borrow from the Wi-Fi radio cloud resources—nothing stops a node from having available compute and directly attached wireless.

Once the system is seen in this way, the need for resource scheduling, by time and distance, becomes interesting. Existing data center resource schedulers (within regions/zones) can optimize for standard workloads, often assuming a fabric network interconnect or other more-or-less symmetric network (every node has just as good of an access over the network to a service as another). Even when resource schedulers try to optimize the placement of services to be near each other, they are often based on the notion of a uniform network penalty that can be minimized, as opposed to being capable of being intimately aware of the physicality of the Wi-Fi radio cloud. Specifically, clients do move in the real world, but often the only Wi-Fi radio that is available for communicating with a client may be the one that is already communicating with the client. Thus, the resource scheduler may be responsible for finding locations to host whatever services in a distributed application in a way to minimize the lag from the client.

Figure 18:
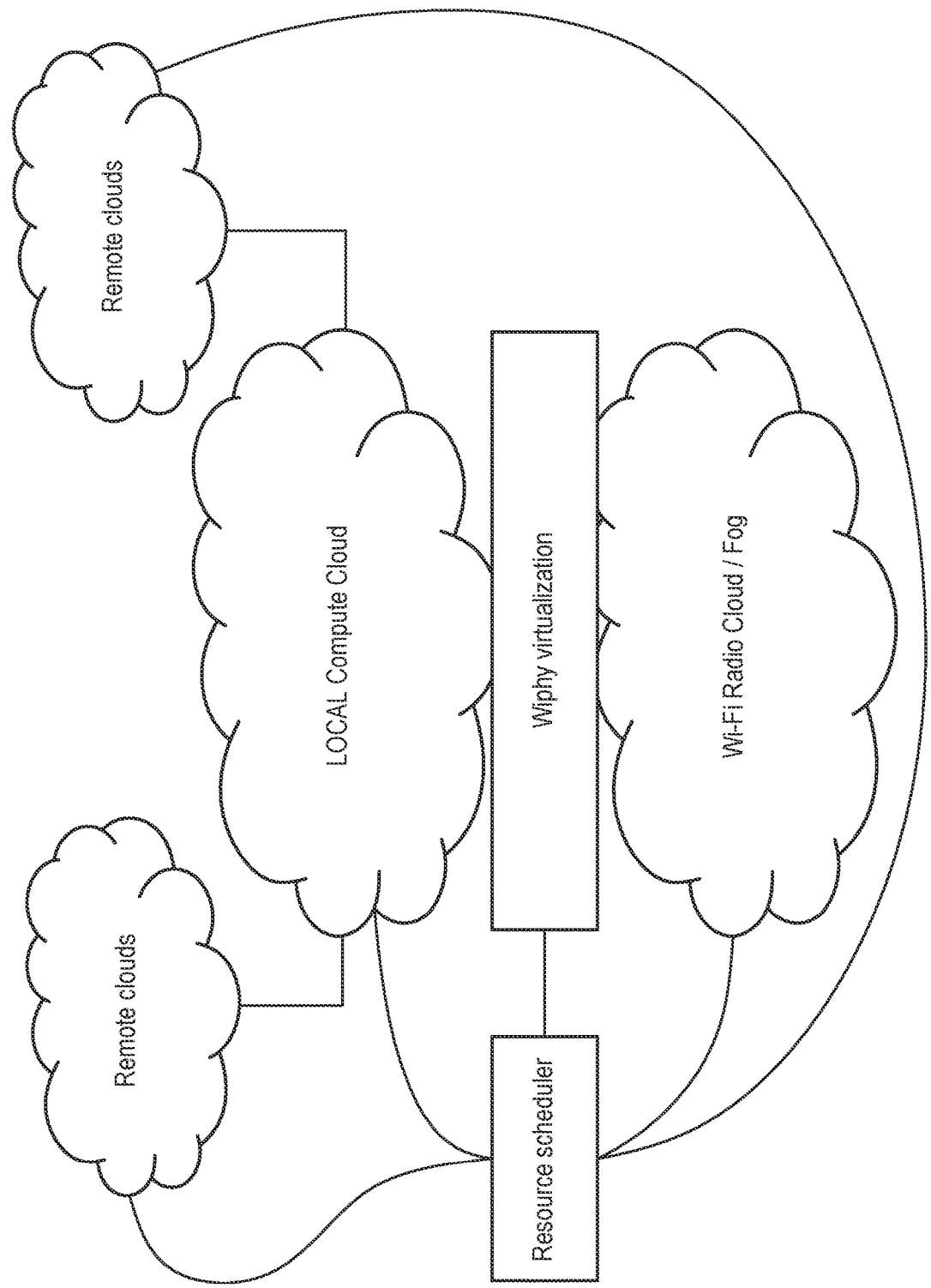
FIG. 18 illustrates an example resource scheduler when local and non-local compute resources co-exist.

FIG. 18 illustrates an example resource scheduler when local and non-local compute resources co-exist. In some embodiments, some of the non-local resources may be hosted in cloud providers or by the Wi-Fi vendor. Parts of a distributed application can be run anywhere, based on optimality, availability, cost, and security.

Figure 19:
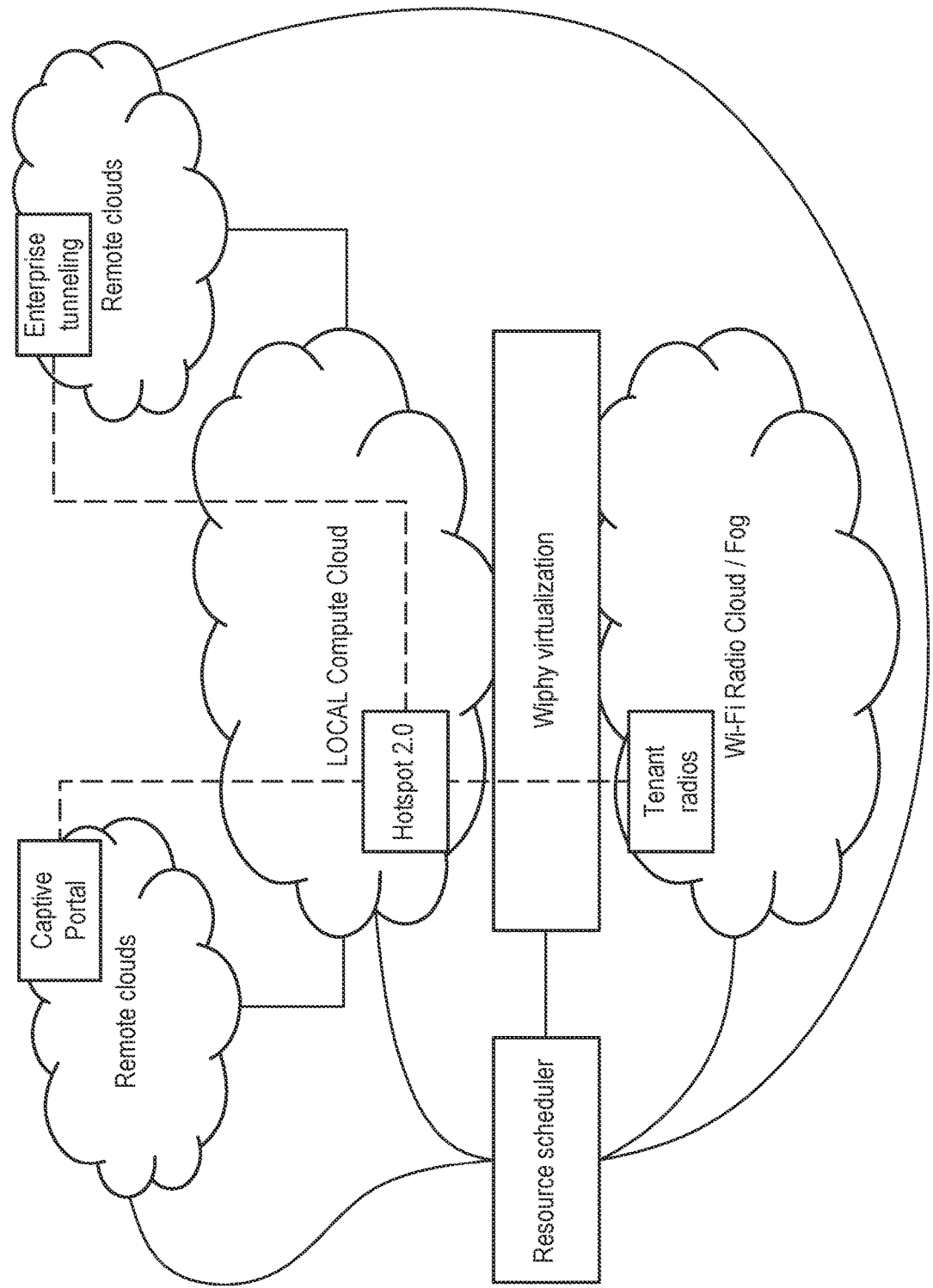
FIG. 19 illustrates an example of a distributed Wi-Fi Passpoint application that is placed, in parts, in desirable locations by the resource scheduler.

FIG. 19 illustrates an example of a distributed Wi-Fi Passpoint application that is placed, in parts, in desirable locations by the resource scheduler. In the example illustrated in FIG. 19, the tenant radios that should host the service may be connected via an overlay network to the Hotspot 2.0 authenticator (hostapd) and control engine, located on premises to the radios (such as in a network-attached compute appliance or local server farm). The Hotspot 2.0 authenticator then may connect the captive portal from a remote cloud (such as that hosted by a mobile carrier, using the webauth service, which is used for all the customers of the mobile carrier). The Hotspot 2.0 may have a tunnel connecting to a tunnel endpoint hosted in a data center owned by an enterprise (such as a content provider). The client may be unaware of the disparate locations of the application parts, but the resource scheduler may be aware of the overlay and can perform the network connections and relocations.

In particular embodiments, a user may move from one campus to another. The resource scheduler may want to follow the user. The resource scheduler can recreate the same overlay infrastructure for the user upon connection in the new campus. This sort of "faulting in" behavior can be quite necessary when one SSID advertises a service that has on-premises requirements (absolutely when the wireless handshakes are implicated, or for optimization purposes such as with WAN acceleration or CDNs.)

Figure 20:
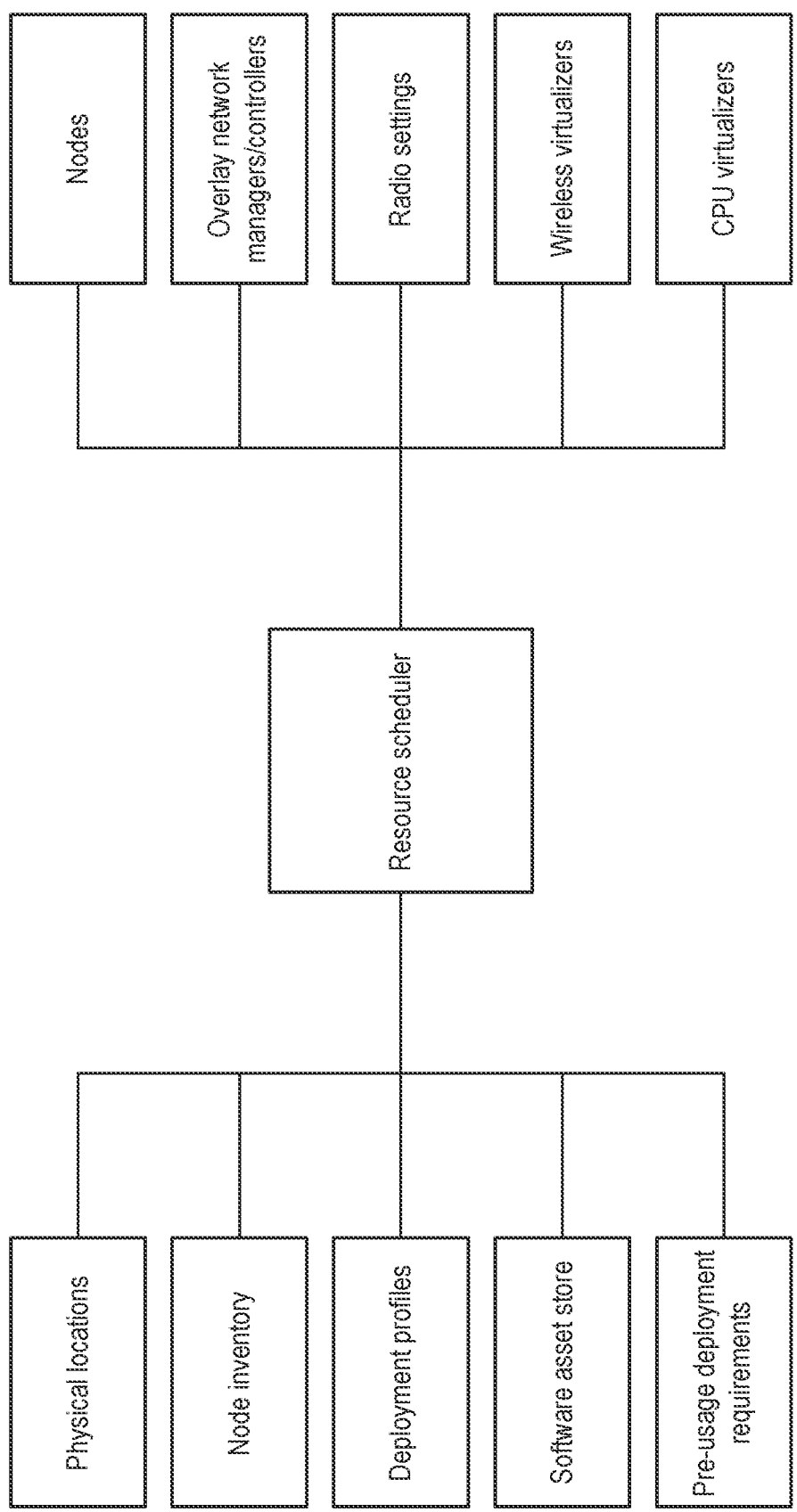
FIG. 20 illustrates an example diagram for relationships that the resource scheduler establishes.

FIG. 20 illustrates an example diagram for relationships that the resource scheduler establishes. The resource scheduler may be one central software running on one machine, or on a replicated or microservices-based data center, or distributed geographically, or managed as any other compute resource by using itself or a smaller instance of itself to bootstrap and run on the same clouds it is deploying into.

The resource scheduler may connect with the physical locations that exist, and the nodes that are in the physical locations, so that the resource scheduler may build out a map of the physicality of the clouds. In some embodiments, the resource scheduler may request the nodes to measure their interconnectivity as well, or at least their connectivity to a few common points, to better anchor the mapping the resource scheduler is developing into the real world. The resource scheduler may also be provided deployment profiles that define the applications, locations where the software assets exist that make up the application. The pre-usage deployment requirements may be a unique prerequisite of Wi-Fi, as clients cannot connect to a service with a specific SSID unless that network name (SSID) is advertised in advance. The pre-usage deployment requirements may require the resource scheduler be able to deploy at least enough resources to the geographies the application is to be offered on for the clients to discover it—more can be faulted in later upon demand once the service is being used.

The resource scheduler may communicate with the nodes and the overlay network controllers that can create the necessary tunnels and overlay networks per the deployment profile, including any key management and encryption accelerators or front-end web decryption software (e.g., HTTPs to HTTP) needed to enable the application. Additionally, the resource scheduler may access the wireless and CPU virtualizers to ensure that at least one way exists on each node to spin up a part of a distributed application that belongs to the node. In some embodiments, the nodes may operate using Kubernetes performing node discovery and orchestration.

The resource scheduler may take the required pre-deployment needs for each application and create the minimal infrastructure for the required pre-deployment needs for each application, both in the clouds and at the wireless radios. In some embodiments, this is the bare minimum, and as more clients gain use of the service, the resource scheduler may detect this and dynamically expands or contracts the amount of resources used. Note that the resource scheduler does not need to operate the orchestration itself. In some embodiments, the remote clouds may be on Amazon Web Services, Google Cloud Platform, or Microsoft Azure clouds, and merely instructing them to scale up or down as needed should work (or allowing them to automatically provide those parts of the services as separate, always-pinned pieces plugged into the same overlay network). However, for the parts of the application that touch wireless or have a low latency, on premises requirement, the resource scheduler may have access to the ability to replicate, deploy, and scale up or down the application footprint on site.

In some embodiments, the resource scheduler may consider the available CPU space of a node and the link quality of the overlay network between a given node and the other nodes in the app, including the radio. For hostapd workloads, this may consider things such as the latency and stability of the link from the workload to radio. For encryption workloads, this may consider the availability and use of hardware crypto accelerators. For machine learning workloads, this may consider the availability of GPUs or tensor operation accelerators on the hardware. Moreover, the resource scheduler may take into account the edge network deployment topology, including the degree of aggregation of traffic at any given node (such as the network topology including Ethernet link counts and bandwidth) or how that compares to the performance depends expected by the node.

In some embodiments, the resource scheduler may determine whether to deploy the application part in a container or in a VM, based on the underlying available infrastructure. Containers may be often faster and more memory efficient, and can be significantly superior in memory and storage performance when depending on a core set of libraries that can be shared across containers or with the OS itself, whereas VMs often have to duplicate those resources up front, with only after-the-fact deduping capabilities possible. However, in a heterogenous deployment with different OS versions—including those where the different OS versions are interspersed in the same wireless environment, the resource scheduler may need to take into account where the resource scheduler might place the loads, and whether it has sufficient resources now (or in the future) to use the optimal assignment or take the hit on performance by VM wrapping the software, at least in part. Network backhaul and power availability homogeneities can also exist, that the resource scheduler can schedule to.

In some embodiments, when a workload needs to be moved, the resource scheduler can choose to stream it across. This can be based on the deployment profile, as well as whether the landing node candidates may or may not support the change.

The resource scheduler can be standalone or integrated into orchestration platforms, such as AWS or Kubernetes, as mentioned above.

Implementation Example—Hardware Overview

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 21:
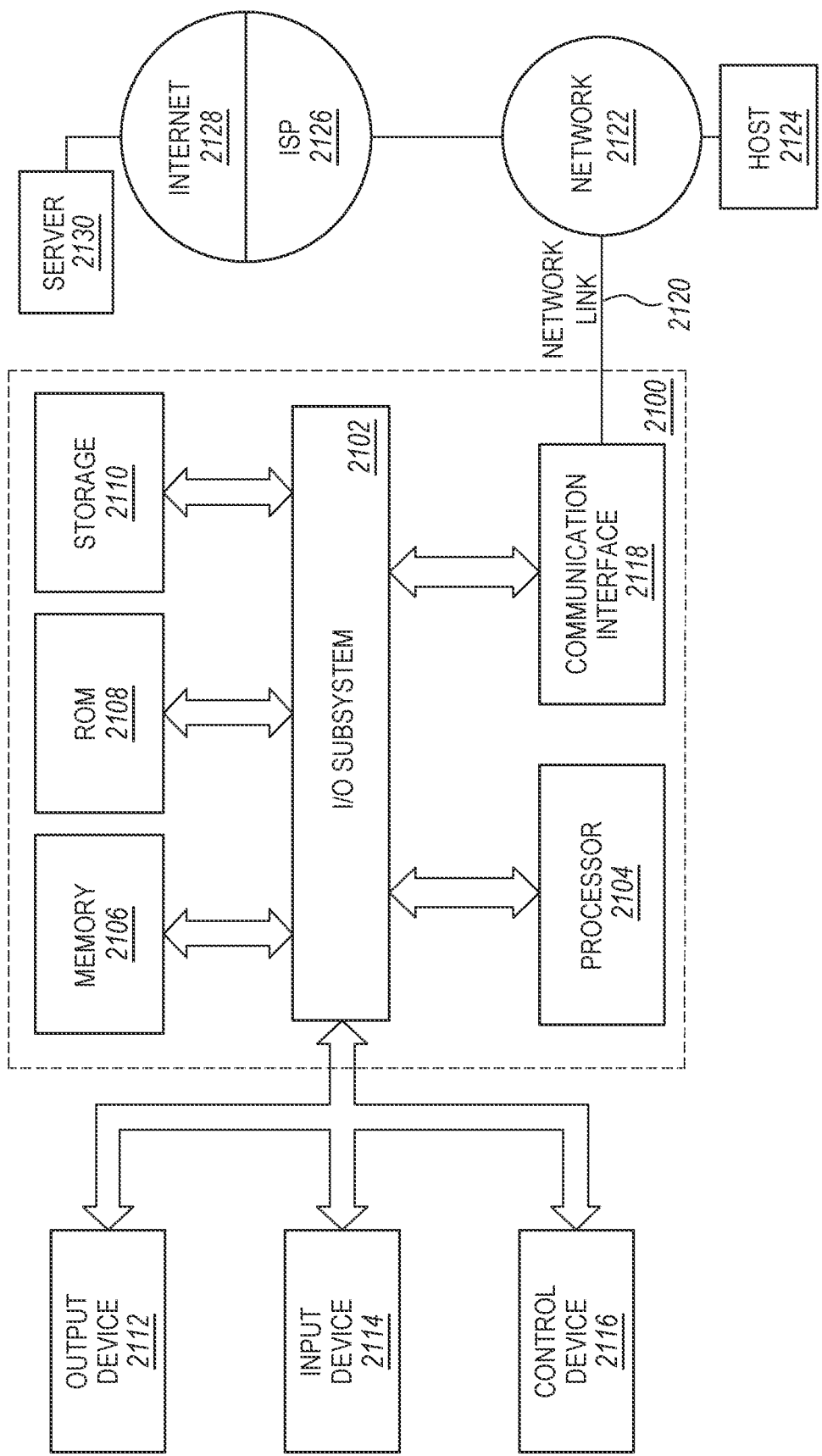
FIG. 21 is a block diagram that illustrates an example computer system with which some aspects of an embodiment may be implemented.

FIG. 21 is a block diagram that illustrates an example computer system with which an embodiment may be implemented. In the example of FIG. 21, a computer system 2100 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 2100 includes an input/output (I/O) subsystem 2102 which may include a bus and/or other communication mechanism(s) for communicating information and/or instructions between the components of the computer system 2100 over electronic signal paths. The I/O subsystem 2102 may include an I/O controller, a memory controller and at least one I/O port. The electronic signal paths are represented schematically in the drawings, for example as lines, unidirectional arrows, or bidirectional arrows.

At least one hardware processor 2104 is coupled to I/O subsystem 2102 for processing information and instructions. Hardware processor 2104 may include, for example, a general-purpose microprocessor or microcontroller and/or a special-purpose microprocessor such as an embedded system or a graphics processing unit (GPU) or a digital signal processor or ARM processor. Processor 2104 may comprise an integrated arithmetic logic unit (ALU) or may be coupled to a separate ALU.

Computer system 2100 includes one or more units of memory 2106, such as a main memory, which is coupled to I/O subsystem 2102 for electronically digitally storing data and instructions to be executed by processor 2104. Memory 2106 may include volatile memory such as various forms of random-access memory (RAM) or other dynamic storage device. Memory 2106 also may be used for storing temporary variables or other intermediate information during execution of instructions to be executed by processor 2104. Such instructions, when stored in non-transitory computer-readable storage media accessible to processor 2104, can render computer system 2100 into a special-purpose machine that is customized to perform the operations specified in the instructions.

Computer system 2100 further includes non-volatile memory such as read only memory (ROM) 2108 or other static storage device coupled to I/O subsystem 2102 for storing information and instructions for processor 2104. The ROM 2108 may include various forms of programmable ROM (PROM) such as erasable PROM (EPROM) or electrically erasable PROM (EEPROM). A unit of persistent storage 2110 may include various forms of non-volatile RAM (NVRAM), such as FLASH memory, or solid-state storage, magnetic disk, or optical disk such as CD-ROM or DVD-ROM and may be coupled to I/O subsystem 2102 for storing information and instructions. Storage 2110 is an example of a non-transitory computer-readable medium that may be used to store instructions and data which when executed by the processor 2104 cause performing computer-implemented methods to execute the techniques herein.

The instructions in memory 2106, ROM 2108 or storage 2110 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 2100 may be coupled via I/O subsystem 2102 to at least one output device 2112. In one embodiment, output device 2112 is a digital computer display. Examples of a display that may be used in various embodiments include a touch screen display or a light-emitting diode (LED) display or a liquid crystal display (LCD) or an e-paper display. Computer system 2100 may include other type(s) of output devices 2112, alternatively or in addition to a display device. Examples of other output devices 2112 include printers, ticket printers, plotters, projectors, sound cards or video cards, speakers, buzzers or piezoelectric devices or other audible devices, lamps or LED or LCD indicators, haptic devices, actuators, or servos.

At least one input device 2114 is coupled to I/O subsystem 2102 for communicating signals, data, command selections or gestures to processor 2104. Examples of input devices 2114 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 2116, which may perform cursor control or other automated control functions such as navigation in a graphical interface on a display screen, alternatively or in addition to input functions. Control device 2116 may be a touchpad, a mouse, a trackball, or cursor direction keys for communicating direction information and command selections to processor 2104 and for controlling cursor movement on display 2112. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 2114 may include a combination of multiple different input devices, such as a video camera and a depth sensor.

In another embodiment, computer system 2100 may comprise an internet of things (IoT) device in which one or more of the output device 2112, input device 2114, and control device 2116 are omitted. Or, in such an embodiment, the input device 2114 may comprise one or more cameras, motion detectors, thermometers, microphones, seismic detectors, other sensors or detectors, measurement devices or encoders and the output device 2112 may comprise a special-purpose display such as a single-line LED or LCD display, one or more indicators, a display panel, a meter, a valve, a solenoid, an actuator or a servo.

When computer system 2100 is a mobile computing device, input device 2114 may comprise a global positioning system (GPS) receiver coupled to a GPS module that is capable of triangulating to a plurality of GPS satellites, determining and generating geo-location or position data such as latitude-longitude values for a geophysical location of the computer system 2100. Output device 2112 may include hardware, software, firmware and interfaces for generating position reporting packets, notifications, pulse or heartbeat signals, or other recurring data transmissions that specify a position of the computer system 2100, alone or in combination with other application-specific data, directed toward host 2124 or server 2130.

Computer system 2100 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 2100 in response to processor 2104 executing at least one sequence of at least one instruction contained in main memory 2106. Such instructions may be read into main memory 2106 from another storage medium, such as storage 2110. Execution of the sequences of instructions contained in main memory 2106 causes processor 2104 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 2110. Volatile media includes dynamic memory, such as memory 2106. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 2102. Transmission media can also take the form of acoustic or light waves, such as those generated during radio-wave and infra-red data communications.

Various forms of media may be involved in carrying at least one sequence of at least one instruction to processor 2104 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 2100 can receive the data on the communication link and convert the data to a format that can be read by computer system 2100. For instance, a receiver such as a radio frequency antenna or an infrared detector can receive the data carried in a wireless or optical signal and appropriate circuitry can provide the data to I/O subsystem 2102 such as place the data on a bus. I/O subsystem 2102 carries the data to memory 2106, from which processor 2104 retrieves and executes the instructions. The instructions received by memory 2106 may optionally be stored on storage 2110 either before or after execution by processor 2104.

Computer system 2100 also includes a communication interface 2118 coupled to bus 2102. Communication interface 2118 provides a two-way data communication coupling to network link(s) 2120 that are directly or indirectly connected to at least one communication networks, such as a network 2122 or a public or private cloud on the Internet. For example, communication interface 2118 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 2122 broadly represents a local area network (LAN), wide-area network (WAN), campus network, internetwork, or any combination thereof. Communication interface 2118 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 2118 sends and receives electrical, electromagnetic, or optical signals over signal paths that carry digital data streams representing various types of information.

Network link 2120 typically provides electrical, electromagnetic, or optical data communication directly or through at least one network to other data devices, using, for example, satellite, cellular, Wi-Fi, or BLUETOOTH technology. For example, network link 2120 may provide a connection through a network 2122 to a host computer 2124.

Furthermore, network link 2120 may provide a connection through network 2122 or to other computing devices via internetworking devices and/or computers that are operated by an Internet Service Provider (ISP) 2126. ISP 2126 provides data communication services through a world-wide packet data communication network represented as internet 2128. A server computer 2130 may be coupled to internet 2128. Server 2130 broadly represents any computer, data center, virtual machine, or virtual computing instance with or without a hypervisor, or computer executing a containerized program system such as DOCKER or KUBERNETES. Server 2130 may represent an electronic digital service that is implemented using more than one computer or instance and that is accessed and used by transmitting web services requests, uniform resource locator (URL) strings with parameters in HTTP payloads, API calls, app services calls, or other service calls. Computer system 2100 and server 2130 may form elements of a distributed computing system that includes other computers, a processing cluster, server farm or other organization of computers that cooperate to perform tasks or execute applications or services. Server 2130 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 2130 may comprise a web application server that hosts a presentation layer, application layer and data storage layer such as a relational database system using structured query language (SQL) or no SQL, an object store, a graph database, a flat file system or other data storage.

Computer system 2100 can send messages and receive data and instructions, including program code, through the network(s), network link 2120 and communication interface 2118. In the Internet example, a server 2130 might transmit a requested code for an application program through Internet 2128, ISP 2126, local network 2122 and communication interface 2118. The received code may be executed by processor 2104 as it is received, and/or stored in storage 2110, or other non-volatile storage for later execution.

The execution of instructions as described in this section may implement a process in the form of an instance of a computer program that is being executed and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 2104. While each processor 2104 or core of the processor executes a single task at a time, computer system 2100 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

Extensions and Alternatives

Throughout this disclosure, multiple inventions are listed that are either separate or derived from other inventions in this disclosure. It is to be understood that the combinations and subprocesses of these inventions are also taught by this disclosure, as the combinations and subprocesses are able to be anticipated by those skilled in the art upon and only upon reading this disclosure. Furthermore, uses of the plural or the singular do not restrict the number of the item being mentioned: unless explicitly called out as not being so or being logically inconsistent, mentions of singular items are to be construed to also be plural and vice versa.

Furthermore, the use of Linux-specific terms, such as wiphy, cfg80211, and the like, are not to be construed as limiting the application to Linux operating systems, but instead are references to some preferred embodiments. Similarly, the mention of Wi-Fi does not limit the application to Wi-Fi radios only; other technologies, such as 5G, Citizens Broadband Radio Service (CBRS), millimeter-wave, and software defined radio technologies are easily understood to be implementable from the teachings in this disclosure.

Throughout this disclosure, multiple alternative embodiments are listed. Each embodiment differs in tradeoffs or effects and as such is a best embodiment for that set of tradeoffs and effects. The choice of alternative to use depends on the tradeoffs or effects desired by an implementer skilled in the art, and such choice is obvious and straightforward within the art and requires no further invention or discovery. Conditional language such as "could", "can", and "may" are intended to refer to and are to be construed as referring to options (manufacture, configuration, or based on availability) within embodiments of the invention and do not state that additional invention is required. For example, the statement that "the invention can react to a given input" means that one configuration of one assembly of an embodiment of the present invention does indeed react to that input. This is done for linguistic economy only and does not suggest uncertainty or incompleteness as it relates to the invention being taught or otherwise. This disclosure does not speculate as to the future state of the art; it states a current invention that has been reduced to practice. Examples are provided as explicit embodiments of the invention, as well as to elucidate the teaching.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A wireless network system comprising:
a set of one or more wireless radios;
a central processing unit (CPU);
memory coupled to the CPU and storing one or more sequences of stored program software instructions providing an operating system for the wireless network system, the sequences of instructions being programmed to cause, when executed using the CPU, creating and storing in the memory:
a driver;
a data structure representing the set of one or more wireless radios, the data structure comprising a list of interface modes that the driver supports when the driver communicates with one of the one or more wireless radios; and
a virtualization module that registers one or more virtualized data structures representing a virtual proxy of one or more aspects of the set of one or more wireless radios, the virtualization module querying the data structure and copying the list of interface modes into the one or more virtualized data structures.

2. The wireless network system of claim 1, the virtualization module being programmed to create one or more network endpoints representing an underlying virtualization granularity.

3. The wireless network system of claim 2, each of the one or more endpoints being associated with a corresponding virtual data structure.

4. The wireless network system of claim 1, the one or more virtualized data structures being accessed through a user space interface.

5. The wireless network system of claim 1, the virtualization module residing in user space, and the virtualization module registering the one or more virtualized data structures through a tap driver.

6. The wireless network system of claim 5, the virtualization module in the user space exercising one or more commands for changing state of the one or more virtualized data structures through a user space interface.

7. The wireless network system of claim 6, the one or more commands comprising adding or removing interfaces, starting new basic service sets (BBSs), changing keys for stations, adjusting power and antennas, changing channels, starting scans, requesting radar detection, or adjusting an association handshake.

8. The wireless network system of claim 1, the sequences of stored program software instructions for the wireless network system further comprising a permission module associated with the virtualization module that maintains allocated resources to one of the one or more virtualized data structure and allows changes to the one of the one or more virtualized data structures within limits of the allocated resources.

9. The wireless network system of claim 8, the permission module mapping each possible operation making changes to the one of the one or more virtualized data structures to allowed behaviors, resource constraints, and responses for failure.

10. The wireless network system of claim 1, each of the one or more virtualized data structures being associated with a priority for a command for controlling the set of one or more wireless radios such that a command associated with a virtualized data structure of a higher priority takes precedence over a command associated with a virtualized data structure of a lower priority.

11. The wireless network system of claim 1, the sequences of stored program software instructions for the wireless network system further comprising a data plane ferry that relays traffic between a driver's interface and a virtual interface associated with one of the one or more virtualized data structures.

12. The wireless network system of claim 1, the sequences of stored program software instructions for the wireless network system further comprising a pair of virtual interfaces associated with one of the one or more virtualized data structures.

13. The wireless network system of claim 1, the virtualization module registering a virtualized data structure isolated in a virtualization container.

14. The wireless network system of claim 1, the virtualization module being placed on a host hardware model process while the one or more virtual data structures being placed within a virtual machine, the virtualization module bridging connections between the one or more virtual data structures and a real data structure representing the set of one or more wireless radios.

15. The wireless network system of claim 1, one of the one or more virtual data structures being on a host machine while the data structure being on a virtual machine.

16. The wireless network system of claim 1, the virtualization module being on a host hardware model process while the set of one or more wireless radios and the data structure representing the set of one or more wireless radios being on a remote machine that is different from the host.

17. The wireless network system of claim 16, a virtualization agent on the remote machine configuring and discovering a state of the set of one or more wireless radios.

18. The wireless network system of claim 17, the virtualization agent on the remote machine and the virtualization module on the host hardware model process communicating over a network.

19. The wireless network system of claim 18, wherein the virtualization module being on a compute cloud while the virtualization agent and the set of one or more wireless radios being on a radio cloud.

20. One or more computer-readable non-transitory storage media storing one or more sequences of stored program software instructions providing an operating system for a wireless network system having a set of one or more wireless radios, the sequences of instructions being programmed to cause, when executed using one or more CPUs, creating and storing in a memory coupled to the one or more CPUs:

a driver;
a data structure representing the set of one or more wireless radios, the data structure comprising a list of interface modes that the driver supports when the driver communicates with one of the one or more wireless radios; and
a virtualization module that registers one or more virtualized data structures representing a virtual proxy of one or more aspects of the set of one or more wireless radios, the virtualization module querying the data structure and copying the list of interface modes into the one or more virtualized data structures.

21. The media of claim 20, the virtualization module being programmed to create one or more network endpoints representing an underlying virtualization granularity.

22. The media of claim 21, each of the one or more endpoints being associated with a corresponding virtual data structure.

23. The media of claim 20, the one or more virtualized data structures being accessed through a user space interface.

24. The media of claim 20, the virtualization module residing in user space, and the virtualization module registering the one or more virtualized data structures through a tap driver.

25. The media of claim 24, the virtualization module in the user space exercising one or more commands for changing state of the one or more virtualized data structures through a user space interface.

26. The media of claim 25, the one or more commands comprising adding or removing interfaces, starting new basic service sets (BBSs), changing keys for stations, adjusting power and antennas, changing channels, starting scans, requesting radar detection, or adjusting an association handshake.

27. The media of claim 20, the sequences of stored program software instructions for the wireless network system further comprising a permission module associated with the virtualization module that maintains allocated resources to one of the one or more virtualized data structure and allows changes to the one of the one or more virtualized data structures within limits of the allocated resources.

28. The media of claim 27, the permission module mapping each possible operation making changes to the one of the one or more virtualized data structures to allowed behaviors, resource constraints, and responses for failure.

29. The media of claim 20, each of the one or more virtualized data structures being associated with a priority for a command for controlling the set of one or more wireless radios such that a command associated with a virtualized data structure of a higher priority takes precedence over a command associated with a virtualized data structure of a lower priority.

30. The media of claim 20, the sequences of stored program software instructions for the wireless network system further comprising a data plane ferry that relays traffic between a driver's interface and a virtual interface associated with one of the one or more virtualized data structures.

* * * * *